US012810305B2

(12) United States Patent
Dilshad Akhtar et al.

(10) Patent No.: US 12,810,305 B2
(45) Date of Patent: Nov. 24, 2026

(54) SUPPORT TICKET SYSTEMS AND METHODS

(71) Applicant: Boost SubscriberCo L.L.C., Englewood, CO (US)

(72) Inventors: Md Dilshad Akhtar, Bangalore (IN); Syed Misbah Ahmed, Bangalore (IN); Kalleri Faizel Rehiman, Freemont, CA (US); Xinyu Lou, Lone Tree, CA (US); Madhu Sowmya Bandi, Englewood, CO (US); Shubham Singh, Lone Tree, CO (US); Vinay W Tiwari, Lone Tree, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/959,172

(22) Filed: Nov. 25, 2024

(65) Prior Publication Data

US 2026/0148241 A1 May 28, 2026

(51) Int. Cl.
*G06Q 30/015* (2023.01)
*G06F 40/40* (2020.01)

(52) U.S. Cl.
CPC .......... *G06Q 30/015* (2023.01); *G06F 40/40* (2020.01)

(58) Field of Classification Search
CPC .............................. G06Q 30/015; G06F 40/40
See application file for complete search history.

(56) References Cited

U.S. PATENT DOCUMENTS

| | | | | |
|---|---|---|---|---|
| 2016/0110723 | A1* | 4/2016 | Shimpi | G06F 16/38 705/304 |
| 2020/0258013 | A1* | 8/2020 | Monnett | H04L 41/5074 |
| 2022/0044254 | A1* | 2/2022 | Dixit | G06Q 30/016 |
| 2022/0261816 | A1* | 8/2022 | Gadot | G06Q 30/016 |
| 2024/0062219 | A1* | 2/2024 | Goche | G06Q 30/015 |
| 2024/0256429 | A1* | 8/2024 | Lucioni | G06F 11/3608 |
| 2025/0139152 | A1* | 5/2025 | Jiang | G06F 40/284 |
| 2025/0225041 | A1* | 7/2025 | O'Neill | G06F 11/3006 |
| 2025/0328570 | A1* | 10/2025 | Zhiboedova | G06F 16/358 |
| 2025/0384076 | A1* | 12/2025 | Pattnayak | G06F 16/355 |

OTHER PUBLICATIONS

"IT Ticket Classification: The Simpler, the Better" Aleksandra Revina, Krisztian Buza, and Vera G. Meister (Year: 2020).*

* cited by examiner

*Primary Examiner* — Alexandru Cirnu
(74) *Attorney, Agent, or Firm* — Kipman T. Werking; Frontier IP Law PLLC

(57) ABSTRACT

A disclosed method may include (i) labeling an original set of support tickets for support calls received at a mobile operator by applying a non-generative machine learning classifier to each support ticket in the original set of support tickets to generate a set of support ticket labels and (ii) evaluating the set of support ticket labels by prompting a large language model with the support ticket labels generated by the non-generative machine learning classifier to generate an evaluation score for each support ticket label.

20 Claims, 9 Drawing Sheets

SUPPORT TICKET SYSTEMS AND METHODS

BRIEF SUMMARY

This disclosure is generally directed to systems, methods, and computer-readable media relating to support ticket labeling. In some customer support environments for telecommunications providers, the management and categorization of support tickets may present numerous challenges that may impact operational efficiency and customer satisfaction. Certain methods of ticket handling may involve processes that may introduce inconsistencies in categorization, potentially resulting in delays in response times and suboptimal resource allocation. These issues may be particularly pronounced in large-scale operations where support teams may encounter thousands of customer interactions daily across various communication channels. In some examples, the volume of tickets generated in such environments may overwhelm certain systems, potentially leading to backlogs and decreased service quality.

The initial triage and categorization of incoming tickets may be a significant hurdle in some support systems. In certain implementations, this process may rely on human agents reviewing each ticket and assigning it to predefined categories based on their interpretation of the issue. This technique may introduce various inefficiencies and potential points of failure. For instance, human categorization may be subject to individual interpretation, which may lead to variations in how similar issues are classified across different agents or even by the same agent at different times. Such inconsistencies may complicate downstream processes, such as ticket routing and trend analysis, potentially resulting in extended resolution times and diminished customer satisfaction. Moreover, some categorization processes may be time-intensive, especially when dealing with high ticket volumes. The time invested in initial triage may delay the actual resolution of customer issues, potentially contributing to backlogs and increased customer frustration.

Another challenge that may arise in certain ticket management systems is the difficulty in swiftly adapting to new types of issues or changes in product offerings. As telecommunications companies introduce new services, features, or technologies, the nature of customer support requests may evolve rapidly. Some categorization systems may struggle to keep pace with these changes, potentially leading to misclassifications or the creation of an excessive number of categories in an attempt to capture all possible issues. This lack of flexibility may result in a system that becomes increasingly complex and unwieldy over time, potentially reducing its effectiveness and efficiency.

The scalability of certain ticket categorization processes may present a significant challenge for growing support operations. As customer bases expand and support volumes increase, the resources required for triage and categorization may grow proportionally, potentially leading to unsustainable operational costs. This scalability issue may force companies to make difficult trade-offs between maintaining categorization accuracy and controlling costs, often resulting in compromises that may negatively impact overall support quality. In some scenarios, companies may need to hire and train additional staff to handle increased ticket volumes, which may be both time-consuming and expensive.

Some ticket management systems may also struggle to provide real-time insights and analytics that may drive strategic decision-making. Delays in categorization and the potential for human error may result in lagging or inaccurate data, making it challenging for management to identify emerging trends, allocate resources effectively, or make data-driven improvements to support processes. This lack of timely and accurate information may hinder an organization's ability to respond quickly to changing customer needs or emerging issues, potentially impacting customer satisfaction and operational efficiency.

In addressing these challenges, advanced ticket management systems leveraging artificial intelligence (AI) and machine learning (ML) technologies may offer potential improvements. These systems may automate the initial categorization process, using natural language processing (NLP) techniques to analyze the content of support tickets and assign them to appropriate categories with a high degree of accuracy and consistency. This automation may potentially reduce the time and resources required for initial triage, enabling support teams to focus more on resolving issues rather than categorizing them. In some implementations, AI-powered categorization may handle large volumes of tickets quickly and consistently, maintaining a high level of performance regardless of ticket volume or time of day.

Advanced ticket management systems may be designed to learn and adapt over time, potentially improving their categorization accuracy as they process more tickets. This adaptive capability may be particularly valuable in rapidly changing support environments, where new issues or product-related queries may emerge frequently. By continuously learning from new data, these systems may stay current with evolving support needs without requiring constant manual updates to categorization rules or taxonomies. This may result in a more flexible and responsive support system that may adapt to changing customer needs and product offerings.

The integration of multi-level categorization in ticket management systems may provide additional benefits. By employing hierarchical classification models, these systems may assign tickets to both broad and specific categories simultaneously. This multi-tiered technique may provide support teams with a more nuanced understanding of ticket distribution, facilitating both high-level trend analysis and detailed issue tracking. For example, a ticket may be categorized under a broad category like "Network Issues" at one level, and a more specific subcategory like "4G Connectivity Problems" at another, enabling different levels of analysis and reporting. This hierarchical structure may enable more granular insights while still maintaining the ability to view trends at a higher level.

The incorporation of large language models (LLMs) in ticket management systems represents another potential advancement in this field. LLMs may be used not only for initial categorization but also for generating concise summaries of ticket content, extracting important information, and even suggesting potential resolutions based on historical data. This capability may potentially enhance the efficiency of support agents by providing them with quickly digestible information and context for each ticket, potentially reducing resolution times and improving the quality of customer interactions. In some scenarios, LLMs may even assist in drafting initial responses to common queries, further streamlining the support process.

Advanced ticket management systems may offer robust analytics and visualization capabilities, transforming raw ticket data into actionable insights. Real-time dashboards may provide support managers with up-to-the-minute views of ticket volumes, categories, and trends, enabling rapid response to emerging issues or sudden spikes in specific types of support requests. These analytics tools may also facilitate predictive modeling, enabling organizations to anticipate future support needs based on historical patterns and current trends. Such predictive capabilities may aid in resource planning, helping organizations allocate staff and resources more effectively to meet expected demand.

In some examples, a method includes (i) labeling an original set of support tickets for support calls received at a mobile operator by applying a non-generative machine learning classifier to each support ticket in the original set of support tickets to generate a set of support ticket labels, (ii) evaluating the set of support ticket labels by prompting a large language model with the support ticket labels generated by the non-generative machine learning classifier to generate an evaluation score for each support ticket label, (iii) categorizing the support tickets based on the evaluation scores into a first set of support tickets with evaluation scores at or above a threshold and a second set of support tickets with evaluation scores below the threshold, (iv) prompting the large language model or another large language model to select a label from a predefined set of support categories maintained by a customer support system of the mobile operator for each support ticket in the first set and to apply an uncategorized label for each support ticket in the second set, and (v) resolving a specific support ticket from the first set based at least in part on the label selected by the large language model or the other large language model for the specific support ticket.

In some examples, the method further comprises prompting the large language model or the other large language model to generate a descriptive summary for each support ticket in the second set.

In some examples, the method further comprises preprocessing the support tickets by removing personally identifiable information or standardizing domain-specific keywords prior to applying the non-generative machine learning classifier.

In some examples, the non-generative machine learning classifier generates two labels with associated probabilities for each support ticket in the original set of support tickets.

In some examples, labeling the original set of support tickets comprises applying a sentence transformer to generate text embeddings for each support ticket prior to classification by the non-generative machine learning classifier.

In some examples, evaluating the set of support ticket labels comprises prompting the large language model with an optimized prompt that was selected based on performance metrics from multiple tested prompts.

In some examples, the method further comprises clustering the support tickets in the first set by applying a text embedding model and an agglomerative clustering algorithm.

In some examples, the method further comprises displaying the resolved support tickets in a user interface.

In some examples, the method further comprises performing a file cleaning operation prior to labeling the original set of support tickets.

In some examples, the original set of support tickets is retrieved from a data estate by executing a database query.

In some examples, the method further comprises removing outlier support tickets from the first set based on the outlier support tickets failing to satisfy a minimum cluster size threshold.

In some examples, the method further comprises improving accuracy of the non-generative machine learning classifier based on feedback received from prompting the large language model or the other large language model.

In some examples, the method further comprises identifying a new support ticket label in the second set by verifying that support tickets in a subset of the second set have respective descriptive summaries that satisfy a similarity threshold.

In some examples, the method further comprises automatically triggering a predefined action for the specific support ticket based at least in part on the label selected by the large language model or the other large language model for the specific support ticket.

In some examples, the non-generative machine learning classifier comprises a support vector machine.

In some examples, labeling the original set of support tickets comprises applying a sentence transformer to each support ticket in the original set of support tickets to generate a numerical representation of the support ticket and inputting the numerical representation of each support ticket to the non-generative machine learning classifier.

In some examples, a non-transitory computer-readable medium has instructions stored thereon that, when executed by at least one physical computing processor, cause a computing device to perform operations comprising (i) labeling an original set of support tickets for support calls received at a mobile operator by applying a non-generative machine learning classifier to each support ticket in the original set of support tickets to generate a set of support ticket labels, (ii) evaluating the set of support ticket labels by prompting a large language model with the support ticket labels generated by the non-generative machine learning classifier to generate an evaluation score for each support ticket label, (iii) categorizing the support tickets based on the evaluation scores into a first set of support tickets with evaluation scores at or above a threshold and a second set of support tickets with evaluation scores below the threshold, (iv) prompting the large language model or another large language model to select a label from a predefined set of support categories maintained by a customer support system of the mobile operator for each support ticket in the first set and to apply an uncategorized label for each support ticket in the second set, and (v) resolving a specific support ticket from the first set based at least in part on the label selected by the large language model or the other large language model for the specific support ticket.

In some examples, a system comprises at least one physical computing processor of a computing device and a non-transitory computer-readable medium that has instructions stored thereon that, when executed by the at least one physical computing processor, cause the computing device to perform operations comprising (i) labeling an original set of support tickets for support calls received at a mobile operator by applying a non-generative machine learning classifier to each support ticket in the original set of support tickets to generate a set of support ticket labels, (ii) evaluating the set of support ticket labels by prompting a large language model with the support ticket labels generated by the non-generative machine learning classifier to generate an evaluation score for each support ticket label, (iii) categorizing the support tickets based on the evaluation scores into a first set of support tickets with evaluation scores at or above a threshold and a second set of support tickets with evaluation scores below the threshold, (iv) prompting the large language model or another large language model to select a label from a predefined set of support categories maintained by a customer support system of the mobile operator for each support ticket in the first set and to apply an uncategorized label for each support ticket in the second set, and (v) resolving a specific support ticket from the first set based at least in part on the label selected by the large language model or the other large language model for the specific support ticket.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
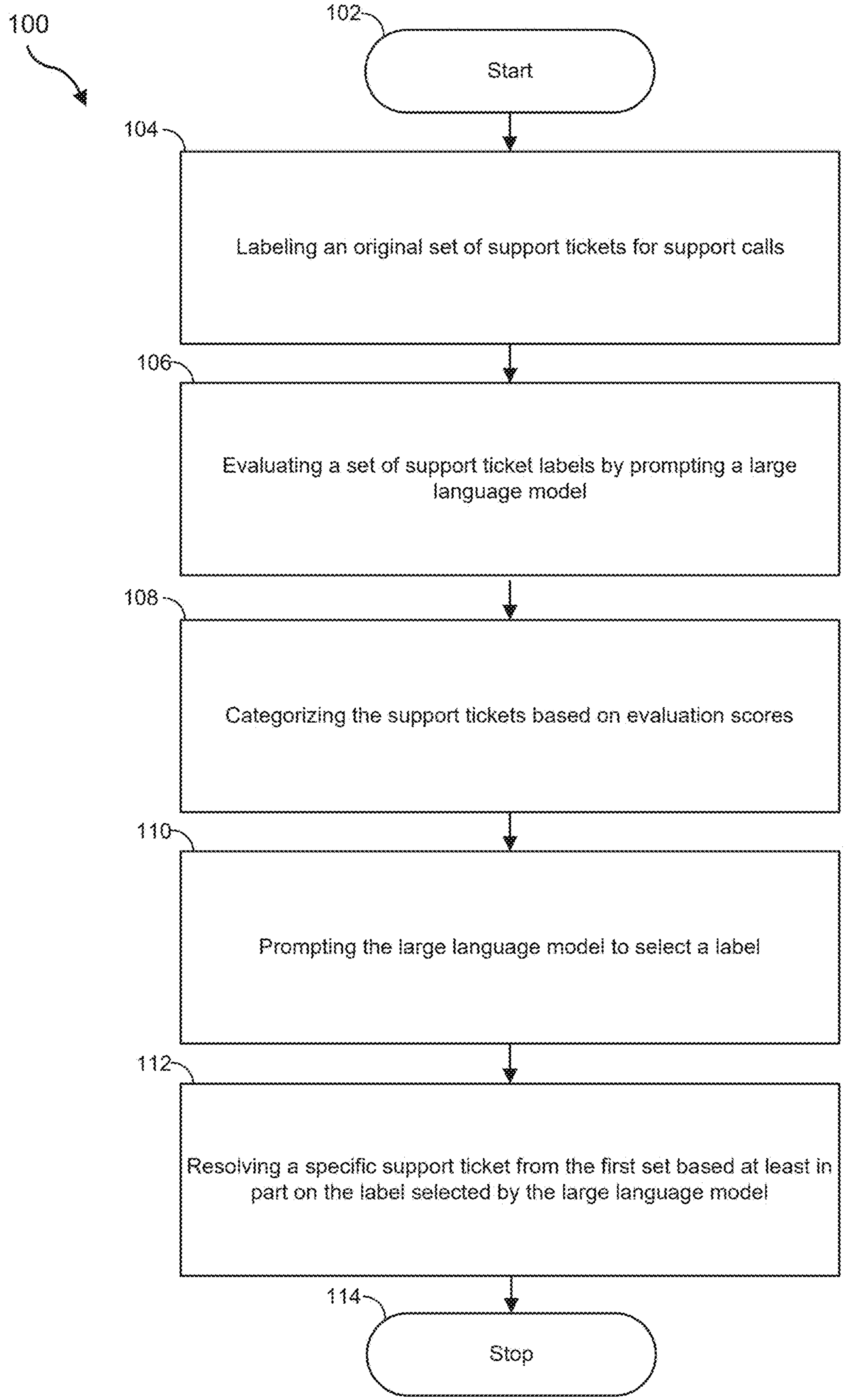
FIG. 1 shows an example flow diagram for a method relating to support ticket systems and methods.

FIG. 1 shows a flow diagram for a method 100 relating to cellular coverage acquisition. At step 102, method 100 may start. At step 104, method 100 includes labeling an original set of support tickets for support calls received at a mobile operator by applying a non-generative machine learning classifier to each support ticket in the original set of support tickets to generate a set of support ticket labels. At step 106, method 100 includes evaluating the set of support ticket labels by prompting a large language model with the support ticket labels generated by the non-generative machine learning classifier to generate an evaluation score for each support ticket label. At step 108, method 100 includes categorizing the support tickets based on the evaluation scores into a first set of support tickets with evaluation scores at or above a threshold and a second set of support tickets with evaluation scores below the threshold. At step 110, method 100 includes prompting the large language model or another large language model to select a label from a predefined set of support categories maintained by a customer support system of the mobile operator for each support ticket in the first set and to apply an uncategorized label for each support ticket in the second set. At step 112, method 100 includes resolving a specific support ticket from the first set based at least in part on the label selected by the large language model or the other large language model for the specific support ticket. At step 114, method 100 ends. As used herein, the term "non-generative machine learning classifier" may generally be used to distinguish earlier machine learning classifiers, such as support vector machine (SVM) classifiers, from later large language models (LLM) that generally may produce larger amounts of prose (e.g., capable of writing a short novel) and/or rely upon later generation machine learning (ML) algorithms, consistent with the discussion below and the understanding of those having skill in the art.

Figure 2:
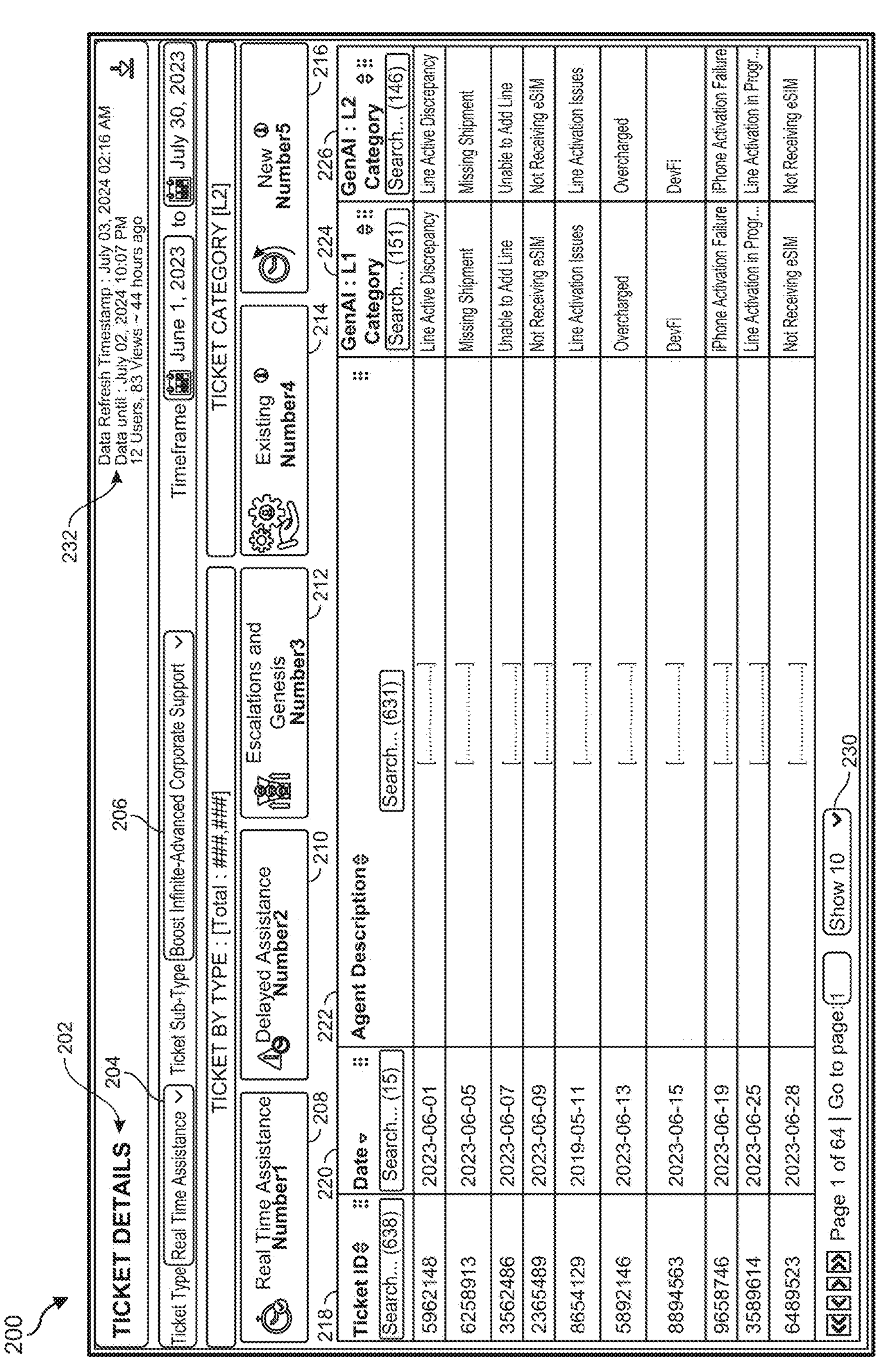
FIG. 2 illustrates an example of a graphical user interface that may be utilized for ticket management and analysis in customer support environments.

FIG. 2 illustrates an example of a graphical user interface (GUI) 200 that may be utilized for ticket management and analysis in customer support environments. The GUI 200 may serve as a central hub for support agents, managers, and analysts to track, categorize, and resolve customer issues. By presenting a wealth of information in a structured format, the GUI 200 may facilitate data-driven decision-making and process optimization within support organizations.

In some implementations, the GUI 200 may include a headline 202 displaying "TICKET DETAILS" at the top of the interface. This clear labeling may help users identify the tool they are using, which may be useful in environments where multiple software applications are in use simultaneously. Below the headline 202, the GUI 200 may present a ticket type drop-down menu 204 for selecting a ticket type. In the example shown, the ticket type drop-down menu 204 displays "Real Time Assistance" as the selected option. This categorization may be important for prioritizing support efforts, as real-time assistance tickets may require prompt attention to maintain customer satisfaction. When toggled, the ticket type drop-down menu 204 may reveal other ticket types, which may include categories such as "Delayed Assistance" or "Scheduled Maintenance," enabling for a comprehensive view of all support activities.

Adjacent to the ticket type drop-down menu 204, the GUI 200 may include another drop-down menu 206 for selecting a ticket sub-type. In the illustrated example, the ticket sub-type drop-down menu 206 shows "Boost Infinite-Advanced Corporate Support" as the selected option. This granular categorization may enable support teams to route tickets to specialized agents or departments, potentially ensuring that each issue is handled by personnel with relevant expertise. The sub-type categorization may also facilitate more detailed reporting and analysis of support trends within specific product lines or customer segments.

In some examples, the GUI 200 may incorporate a metadata section 232 that may provide information about data freshness and user interaction. This metadata section 232 may display a data refresh timestamp, such as "data until: Jul. 2, 2024 10:07 PM," along with user engagement metrics like the number of users accessing the interface, the number of views, and the time elapsed since the last view. In some implementations, the metadata section 232 may show "12 users, 83 views, ~44 hours ago" or similar information. These metrics may serve multiple purposes: they may help ensure that users are working with up-to-date information, provide insights into the tool's usage patterns, and potentially identify periods of high support activity or user engagement.

The central area of the GUI 200 may include several output elements arranged to present ticket statistics, offering a high-level overview of the support landscape. An output element 208 may indicate the number of real-time assistance tickets, providing insight into the volume of urgent issues. Adjacent to this, an output element 210 may display the number of delayed assistance tickets, which may represent less time-sensitive matters. Another output element 212 may show the count of "Escalations and Genesis" tickets, potentially highlighting complex issues that may require special attention or have been elevated to higher support tiers.

Above these elements, the GUI 200 may include an additional output element that aggregates and displays the total number of tickets across all types, prefaced by the label "TICKET BY TYPE:" For instance, this element might show a total of ###, ###tickets. This summary statistic may provide a quick snapshot of overall support volume, which may be valuable for resource planning and performance evaluation.

The GUI 200 may also feature output elements related to ticket categorization, potentially leveraging advanced technologies like artificial intelligence (AI) for more efficient ticket processing. An output element 214 may present the number of existing tickets, while an output element 216 may show the count of new tickets. This distinction may help support teams prioritize their efforts, potentially ensuring that new issues are addressed promptly while also managing the backlog of existing tickets. Above these elements, the GUI 200 may include a "TICKET CATEGORY" label with an "[L2]" toggle, indicating the current categorization level being displayed. This multi-level categorization system may enable for both broad and detailed views of ticket distribution, supporting various analytical needs.

To facilitate date range selection and temporal analysis, the GUI 200 may incorporate a timeframe section positioned to the right of the ticket sub-type drop-down menu 206. This section may include input elements for specifying start and end dates, enabling users to filter ticket data based on a particular time period. This feature may be valuable for identifying trends, measuring the impact of specific events or changes, and generating time-based reports on support performance.

The main body of the GUI 200 may consist of a table presenting detailed ticket information, forming the core of the ticket management system. This table may include several columns, each providing specific data points to create a comprehensive view of each ticket. A ticket ID column 218 may display unique identifiers for each ticket (e.g., 5962148), enabling quick reference and tracking of individual issues. A date column 220 may show the ticket creation date (e.g., 2023-06-01), which may be important for monitoring response times and identifying potential backlogs. An "Agent Description" column 222 may contain brief summaries of ticket issues (e.g., "line showing active on Customer Portal but not showing active in . . . "), providing a quick overview of the problem without the need to open the full ticket details. This may help agents quickly assess and prioritize tickets based on their content.

The inclusion of "GenAI: L1 Category" column 224 and a "GenAI: L2 Category" column 226 may indicate the integration of artificial intelligence (AI) in the ticket management process. These columns may present AI-generated categorizations such as "Missing Shipment" or "Unable to Add Line". The use of AI for ticket categorization may offer several potential benefits: it may improve consistency in categorization across large volumes of tickets, reduce the manual effort required for initial triage, and potentially identify patterns or issues that human agents might overlook. In some examples, the two-level categorization (L1 and L2) may provide both broad and specific classifications, supporting different levels of analysis and reporting.

At the bottom of the GUI 200, pagination controls may be implemented to manage the display of ticket entries, potentially ensuring that the interface remains responsive and easy to navigate even when dealing with large numbers of tickets. A drop-down menu 230 may enable users to select the number of tickets or rows to display per page, accommodating different user preferences and screen sizes. Additionally, the GUI 200 may include navigation buttons for moving between pages, such as "next page," "first page," "previous page," and "last page," as well as a "go to page" input element for direct page access. These pagination features may enhance usability, especially when working with extensive datasets, by enabling users to quickly locate specific tickets or review subsets of the data.

By presenting this comprehensive set of features and controls, the GUI 200 may provide users with a tool for analyzing and managing support tickets. The combination of filtering options, statistical summaries, and detailed ticket information may enable users to gain insights and take appropriate actions based on the presented data. This interface may support a wide range of activities, from day-to-day ticket resolution to long-term strategic planning and process improvement in customer support operations.

Figure 3:
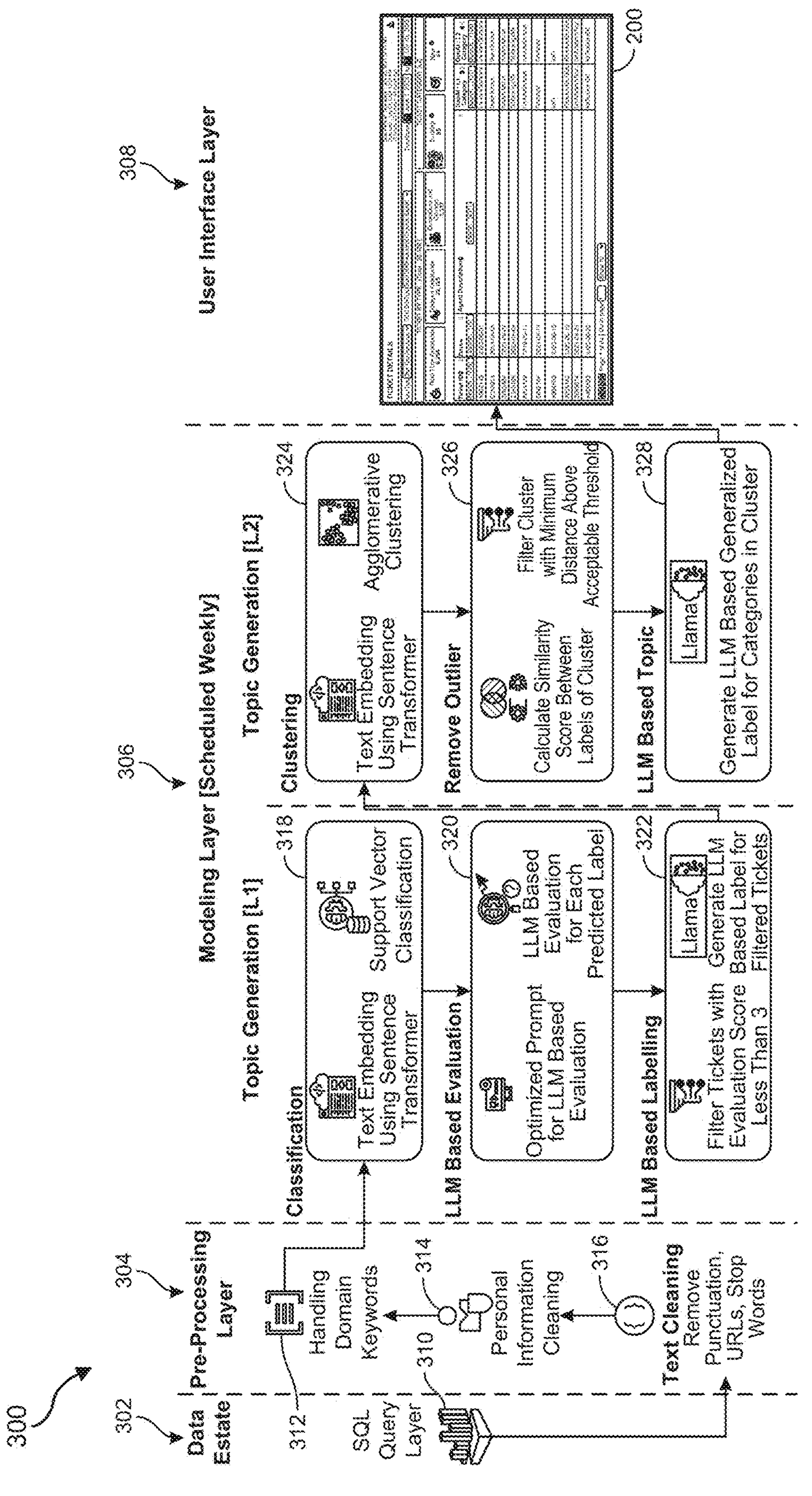
FIG. 3 shows an example workflow diagram that may represent a ticket processing and categorization system.

FIG. 3 illustrates an example of a workflow diagram 300 that may be utilized in a ticket management and analysis system. The workflow diagram 300 may depict a process flow that proceeds from left to right across four main columns, each representing a different stage or layer of the ticket processing system. These layers may work in conjunction to transform raw ticket data into actionable insights and user-friendly visualizations. In some implementations, the leftmost column of the workflow diagram 300 may represent a data estate 302. The data estate 302 may serve as the initial repository for incoming ticket information and may include an structured query language (SQL) Database SQL query layer 310. The SQL Database SQL query layer 310 may be utilized to efficiently retrieve and organize relevant ticket data from potentially large and complex datasets. By employing SQL queries, the system may selectively extract pertinent information, potentially reducing the processing load on subsequent stages and ensuring that only relevant data progresses through the workflow. This selective extraction process may be particularly beneficial in environments where high volumes of tickets are processed daily, as it may help streamline the analysis pipeline and focus computational resources on the most relevant data points.

Adjacent to the data estate 302, the workflow diagram 300 may depict a pre-processing layer 304. This pre-processing layer 304 may encompass several steps designed to refine and standardize the raw ticket data. In some examples, the pre-processing layer 304 may include a handling domain keywords step 312, which may be responsible for identifying and potentially standardizing industry-specific terminology or jargon that may be present in the ticket descriptions. This step may help ensure consistency in how technical terms are interpreted and categorized throughout the subsequent processing stages. The handling domain keywords step 312 may involve techniques such as term normalization, acronym expansion, or the application of domain-specific dictionaries to transform varied expressions of the same concept into a standardized format. Following the handling domain keywords step 312, the pre-processing layer 304 may include a personal information cleaning step 314. This step may be important for maintaining customer privacy and complying with data protection regulations. The personal information clearing step 314 may identify and remove or mask sensitive personal information from the ticket data, potentially reducing the risk of unauthorized disclosure while still preserving the content of the ticket for analysis purposes. This process may involve techniques such as named entity recognition to identify personal information, and data anonymization methods to replace sensitive details with non-identifying placeholders.

The final step within the pre-processing layer 304 may be a text cleaning process 316, which may be designed to remove punctuation, URLs, or stop words from the ticket descriptions. This text cleaning step 316 may help standardize the format of the ticket text, potentially improving the accuracy and efficiency of subsequent analysis steps by removing elements that may not contribute significantly to the meaning or categorization of the ticket. The removal of punctuation may help create a more uniform text representation, while eliminating URLs may prevent web addresses from being misinterpreted as meaningful text. Stop word removal may focus the analysis on the most informative words in the ticket description, potentially enhancing the performance of subsequent natural language processing tasks. Collectively, these pre-processing steps may create a cleaner, more standardized dataset that may be more effectively analyzed by the modeling layer.

Moving to the right in the workflow diagram 300, the next column may represent the modeling layer 306. This modeling layer 306 may be divided into two sub-columns: topic generation L1 on the left and topic generation L2 on the right. These sub-columns may indicate a two-level technique to ticket categorization and analysis, potentially enabling for both broad and specific classification of tickets. This multi-level technique may provide a more nuanced understanding of the ticket content, enabling support teams to view issues at different levels of granularity. Within the modeling layer 306, the workflow may begin with a classification step 318. This classification step 318 may involve two components: text embedding using a sentence transformer on the left, and support vector classification on the right. The text embedding process may convert the cleaned ticket text into numerical vectors, potentially capturing the semantic meaning of the text in a format that may be more easily processed by machine learning (ML) algorithms. These embeddings may represent words, phrases, or entire sentences as dense vectors in a high-dimensional space, where similar meanings are positioned closer together. The support vector classification may then use these embeddings to categorize the tickets into predefined classes or categories. Support vector machines may be particularly effective for this task due to their ability to handle high-dimensional data and find optimal decision boundaries between different ticket categories.

Following the classification step 318, the modeling layer 306 may include an large language model (LLM) based evaluation step 320. This step may comprise an optimized prompt for LLM based evaluation on the left, and LLM based evaluation for each predicted label on the right. The LLM based evaluation step 320 may leverage large language models to assess the accuracy and appropriateness of the classifications generated in the previous step, potentially providing a layer of validation and refinement to the categorization process. The use of optimized prompts may guide the language model to focus on specific aspects of the ticket content and classification, potentially improving the relevance and accuracy of the evaluation. By applying this evaluation to each predicted label, the system may provide a confidence score or validation metric for the initial classification, which may be used to identify cases that may require further analysis or human review.

The next component in the modeling layer 306 may be an LLM based labeling step 322. This step may involve filtering tickets with evaluation scores less than a certain threshold (e.g., less than three) on the left, and generating LLM based labels for the filtered tickets on the right. This process may help identify tickets that may have been challenging to classify accurately using the initial classification method. By applying the more computationally intensive LLM based labeling to only the tickets that meet or exceed the evaluation threshold (e.g., scores of 3 or higher), the system may balance efficiency with accuracy, potentially providing high-quality categorizations for the cases that the initial SVM classification handled well, while flagging lower-scoring tickets for additional review or manual processing. This technique may help maintain overall system performance while ensuring that the final categorizations leverage the strengths of both the SVM and LLM models. For tickets with scores below the threshold, the system may generate a descriptive summary using the LLM, which may aid human agents in quickly understanding and categorizing these more challenging cases. This two-tiered technique may potentially optimize the use of computational resources while still providing valuable insights for all tickets.

The modeling layer 306 may further include a clustering step 324, which may employ text embedding using a sentence transformer on the left and agglomerative clustering on the right. This clustering process may group similar tickets together, potentially revealing patterns or common themes among the support issues that may not be immediately apparent from the predefined categories alone. The use of text embeddings in this step may enable clustering based on semantic similarity rather than just surface-level text matching, potentially uncovering deeper relationships between different support issues. Agglomerative clustering, a hierarchical clustering method, may provide a flexible technique to grouping tickets, enabling for the discovery of clusters at various levels of granularity. This clustering step may be particularly useful for identifying emerging issues or trends that may not fit neatly into existing categories, potentially providing valuable insights for proactive support strategies and product improvement initiatives.

Following the clustering step 324, the modeling layer 306 may incorporate a remove outlier step 326. This step may involve calculating similarity scores between labels of clusters on the left, and filtering clusters with minimum distances above an acceptable threshold on the right. By identifying and potentially removing outlier tickets or clusters, this step may help refine the analysis results and focus attention on the most significant and representative groups of support issues. This outlier removal process may improve the overall quality of the analysis by reducing the impact of anomalous or misclassified tickets, potentially leading to more accurate and actionable insights for support teams. The removal of outliers may also help in creating more coherent and meaningful cluster representations, which may be valuable for subsequent analysis and reporting.

The final component of the modeling layer 306 may be an LLM based topic step 328. This step may generate LLM based generalized labels for categories and clusters, potentially providing a higher-level summary or description of the ticket groups identified through the previous analysis steps. By leveraging the natural language generation capabilities of large language models, this step may create human-readable, descriptive labels that capture the essence of each ticket category or cluster. These generated topics may provide an easily interpretable overview of the support landscape, potentially aiding in quick identification of emerging issues or trends. The use of LLMs for topic generation may result in more nuanced and context-aware descriptions compared to traditional keyword-based techniques, potentially offering deeper insights into the nature of customer issues.

The rightmost column of the workflow diagram 300 may represent the user interface layer 308. In some implementations, this layer may be depicted by an icon that references the graphical user interface (GUI) 200 discussed in relation to FIG. 2. The user interface layer 308 may serve as the final stage in the workflow, where the processed and analyzed ticket data may be presented to support agents, managers, or analysts in a visually intuitive and interactive format. This layer may integrate the results from all previous stages of the workflow, potentially presenting categorized and clustered tickets, evaluation scores, generated topics, and other relevant metrics in a cohesive and user-friendly manner. The user interface may enable dynamic exploration of the data, potentially enabling users to drill down into specific categories, view ticket details, or analyze trends over time. By providing a comprehensive view of the support ticket landscape, the user interface may empower support teams to make data-driven decisions and respond more effectively to customer needs.

The above example focuses on Athena or SQL databases but in other examples any other suitable database technology may be used. In modern data management systems, organizations may store, retrieve, and analyze large volumes of information in various ways. This is applicable in the context of support ticket management, where organizations may handle thousands or even millions of customer interactions daily. To address these needs, a variety of database systems and query technologies have been developed, each with its own characteristics and potential use cases. Structured Query Language (SQL) is a standardized language for managing and manipulating relational databases. It provides a set of commands for creating, reading, updating, and deleting data, as well as for performing aggregations and joins across multiple tables. SQL's widespread adoption and versatility make it a common choice for many data management tasks, including ticket analysis. Relational databases, which use SQL as their primary interface, organize data into tables with predefined schemas. Some relational database management systems (RDBMS) include MySQL, PostgreSQL, Oracle Database, and Microsoft SQL Server. These systems may maintain data integrity through features like ACID (Atomicity, Consistency, Isolation, Durability) transactions and may be suitable for structured data with clear relationships.

The world of databases extends beyond traditional relational systems. Not only structured query language (NoSQL) databases have gained usage for their ability to handle unstructured or semi-structured data, which may be the case with support tickets that may contain free-form text, attachments, or varying metadata. NoSQL databases may be categorized into several types, including document databases, key-value stores, column-family stores, and graph databases. Document databases, such as MongoDB and Couchbase, store data in flexible, JavaScript Object Notation (JSON)-like documents. These may be suitable for ticket systems where each ticket may have a variable structure or contain nested information. Key-value stores, like Redis and Amazon DynamoDB, offer simple, fast access to data based on a unique key. These databases may be effective for caching frequently accessed ticket information or for maintaining session data in web-based support systems. Column-family stores, such as Apache Cassandra and ScyllaDB, are designed for handling large volumes of data across distributed systems. These databases organize data into column families, which may be beneficial for ticket systems that need to scale horizontally and handle high write throughput.

When it comes to querying and analyzing data across different database systems, there are various tools and technologies available. SQL, as mentioned earlier, is widely used for querying relational databases. However, for Not only structured query language (NoSQL) databases, each system often has its own query language or application programming interface (API). To provide a unified interface for querying different types of databases, some organizations use data virtualization or federation tools. These tools enable users to query data across multiple disparate sources as if they were a single database. This may be particularly useful in ticket management systems that may store different types of data in various databases or data lakes. Apache Spark is another technology that may be used for large-scale data processing and analysis across different data sources. Apache Spark provides a unified analytics engine that may work with structured, semi-structured, and unstructured data. Its SQL module, Spark SQL, enables users to query data using SQL-like syntax, regardless of the underlying data storage format.

For real-time data processing and analysis, stream processing systems like Apache Kafka and Apache Flink may be employed. These systems may ingest, process, and analyze data in real-time, which may be beneficial for monitoring ticket volumes, detecting anomalies, or triggering automated responses based on incoming ticket patterns. To enhance query performance, especially for large datasets, various indexing and partitioning strategies may be employed. Indexes may speed up data retrieval operations by creating additional data structures that enable faster lookups. Partitioning, on the other hand, involves dividing large tables into smaller, more manageable pieces based on certain criteria, such as date ranges or categories. This may improve query performance by enabling the database to scan only relevant partitions. Caching mechanisms may also be implemented to improve response times for frequently accessed data. In-memory databases like Redis or Memcached may be used to store frequently accessed ticket information, reducing the load on the primary database and improving overall system performance.

For organizations dealing with sensitive customer information in support tickets, data encryption and access control mechanisms are crucial considerations. Many database systems offer built-in encryption features for data at rest and in transit. Additionally, role-based access control (RBAC) and attribute-based access control (ABAC) may be implemented to ensure that only authorized personnel may access specific ticket data or perform certain operations. The choice of database system and associated technologies for ticket management and analysis may depend on various factors, including the volume and variety of data, query patterns, scalability requirements, and existing infrastructure. Organizations may also choose to implement a polyglot persistence technique, using different database types for different aspects of their ticket management system to leverage the strengths of each technology.

Large Language Models (LLMs) are advanced artificial intelligence (AI) systems designed to understand, process, and generate human-like text. These models are trained on vast amounts of textual data, enabling them to capture complex language patterns, contextual relationships, and semantic meanings. LLMs may be applied to various aspects of support ticket management and analysis, potentially offering improvements in ticket categorization, sentiment analysis, and automated response generation.

The architecture of LLMs typically involves transformer-based neural networks, which use self-attention mechanisms to process and generate text. These models may be categorized into several types based on their architecture and training technique. Autoregressive models, such as GPT (Generative Pre-trained Transformer) series, generate text sequentially and are particularly effective for tasks like text completion and generation. Bidirectional models, like BERT (Bidirectional Encoder Representations from Transformers), consider context from both directions and excel in tasks such as text classification and question answering. There are also hybrid models that combine aspects of both techniques.

Some examples of LLMs include GPT-3 and GPT-4 developed by OpenAI, BERT and its variants (e.g., RoBERTa, ALBERT) from Google, XLNet from Carnegie Mellon University and Google Brain, T5 (Text-to-Text Transfer Transformer) from Google, and Llama from Meta. Each of these models, or similar alternatives, may potentially be used in support ticket management systems, depending on the specific requirements and use cases.

In the context of support ticket systems, LLMs may be used to analyze ticket content, extract relevant information, and provide insights. For ticket categorization, an LLM may be fine-tuned on a dataset of previously categorized support tickets, learning to classify new tickets into appropriate categories. This technique may potentially handle a wide range of ticket types and adapt to evolving customer issues. LLMs may also generate multiple category suggestions with associated confidence scores, which may be useful for tickets that may span multiple issue types.

LLMs may be applied to generate summaries of support tickets, condensing lengthy descriptions into concise summaries that highlight key issues and relevant details. This may help support agents quickly understand the nature of a problem without having to read through extensive ticket content. Additionally, LLMs may be used to generate metadata tags for tickets, extracting important entities, products, or problem types mentioned in the ticket text.

Sentiment analysis is another area where LLMs may be employed in support ticket management. By analyzing the language used in a ticket, these models may gauge the customer's emotional state and the urgency of the issue. This information may be valuable for prioritizing tickets and ensuring that particularly dissatisfied customers receive prompt attention. LLMs may be fine-tuned to detect specific emotions or attitudes that are relevant to customer support contexts.

In more advanced implementations, LLMs may be used to generate suggested responses to common customer queries. By training on a large corpus of previous support interactions, these models may learn to provide context-appropriate responses that match the tone and style of human support agents. This capability may potentially assist support staff in drafting responses or providing initial suggestions for ticket resolution.

LLMs may also be utilized for knowledge base management and ticket routing. These models may analyze ticket content and suggest relevant knowledge base articles or internal documentation that may help resolve the issue. LLMs may be trained to understand the expertise required for different types of problems, potentially improving the accuracy of ticket routing to appropriate support teams or individual agents.

The application of LLMs in support ticket systems may be customized to suit specific organizational needs. For example, models may be fine-tuned on domain-specific data, enabling them to develop expertise in particular areas of customer support or product knowledge. This fine-tuning process may potentially enhance the model's performance on industry-specific or company-specific language and issues.

LLMs may also be integrated with other AI technologies to create more comprehensive support ticket management solutions. For instance, they may be combined with traditional machine learning classifiers, rule-based systems, or specialized models for specific tasks like named entity recognition. This hybrid technique may leverage the strengths of different AI techniques to create a more robust and versatile support ticket analysis system.

Classifiers are components of machine learning systems, designed to categorize input data into predefined classes or categories. In the context of support ticket management, classifiers may be used to automatically categorize tickets based on their content, priority, or other relevant attributes. While Large Language Models (LLMs) have gained prominence in recent years, pre-LLM, non-generative classifiers remain distinct and valuable tools in the machine learning (ML) ecosystem, each with their own strengths and applications.

Non-generative classifiers, which predate LLMs, typically focus on making predictions or classifications based on input features without generating new text or content. These classifiers may often be faster to train and deploy, and may require less computational resources compared to LLMs. In support ticket management systems, these earlier generation classifiers might be used for initial ticket categorization or priority assignment, while LLMs may be employed for more complex tasks such as sentiment analysis or response generation.

Support Vector Machines (SVMs) are a type of supervised learning algorithm used for classification and regression tasks. SVMs work by finding the optimal hyperplane that separates different classes in a high-dimensional feature space. In support ticket classification, an SVM might be trained on a dataset of previously categorized tickets, learning to distinguish between different ticket types based on features extracted from the ticket text or metadata. SVMs may handle both linear and non-linear classification problems through the use of kernel functions.

Decision Trees and Random Forests represent another family of classifiers that may be effective for ticket categorization. Decision Trees make classifications by following a series of if-then rules, creating a tree-like model of decisions. Random Forests extend this concept by creating an ensemble of decision trees, where the final classification is determined by aggregating the predictions of multiple trees. These algorithms may handle both numerical and categorical data and provide easily interpretable rules for classification decisions.

Naive Bayes classifiers, based on Bayes' theorem, are often used for text classification tasks like ticket categorization. These classifiers assume independence between features, which, while often not strictly true in practice, may still lead to good performance, especially with large datasets. Naive Bayes classifiers are computationally efficient and may perform well even with relatively small training datasets, making them suitable for scenarios where training data may be limited or where fast training and prediction times are required.

Logistic Regression, despite its name, is a linear model used for classification rather than regression. It estimates the probability of an instance belonging to a particular class. In multi-class classification scenarios, which are common in support ticket systems with multiple ticket categories, techniques like One-vs-Rest or Softmax Regression may be employed. Logistic Regression models are relatively simple to implement and interpret, making them a good choice when explainability of the classification process is important.

K-Nearest Neighbors (KNN) is a simple yet often effective classification algorithm that may be applied to ticket categorization. KNN classifies a new ticket by finding the K most similar tickets in the training dataset and assigning the most common category among these neighbors. While computationally intensive for large datasets, KNN may be effective when the decision boundary between categories is irregular and not easily captured by linear models.

Gradient Boosting Machines (GBM), including popular implementations like XGBoost, LightGBM, and CatBoost, are ensemble learning methods that have shown strong performance in various classification tasks. These algorithms build a series of weak learners (typically decision trees) sequentially, with each new model focusing on the errors of the previous ones. In support ticket systems, gradient boosting machines may be effective for handling complex relationships in the data and may often achieve high accuracy with proper tuning.

These pre-LLM classifiers may differ from LLMs in key aspects. First, they typically require less computational resources for training and inference, making them more suitable for real-time or resource-constrained environments. Second, they often work with structured feature representations of the input data, rather than processing raw text directly. This may make them more efficient for certain types of classification tasks but may limit their ability to capture nuanced language understanding.

In contrast, LLMs like GPT, BERT, or Llama are designed to process and generate human-like text. They may capture complex language patterns and contextual relationships, enabling them to understand and generate text in a more nuanced way. However, this capability comes at the cost of increased computational requirements and longer processing times.

In a support ticket management system, pre-LLM classifiers and LLMs may be used in complementary ways. For example, a support vector machine or random forest classifier might be used for initial ticket categorization, quickly assigning tickets to broad categories based on extracted features. This initial classification may help with ticket routing and prioritization.

Following this initial classification, an LLM might be employed for more complex tasks. It may analyze the ticket content in greater depth, extracting sentiment, identifying specific product mentions, or generating suggested responses. The LLM's ability to understand context and nuance may be particularly valuable for these tasks.

Another way to leverage both types of models is to use pre-LLM classifiers for rapid, high-volume processing of tickets, and reserve LLMs for tickets that require more detailed analysis or have been flagged as complex or high-priority. This technique may balance the need for quick processing with the desire for deep understanding of certain tickets.

The choice between pre-LLM classifiers and LLMs, or the decision to use both in a complementary fashion, depends on factors such as the specific requirements of the support ticket system, available computational resources, the volume and complexity of tickets, and the desired balance between speed and depth of analysis. By understanding the strengths and limitations of each technique, support ticket management systems may be designed to leverage the most appropriate tools for each stage of the ticket handling process.

Figure 4:
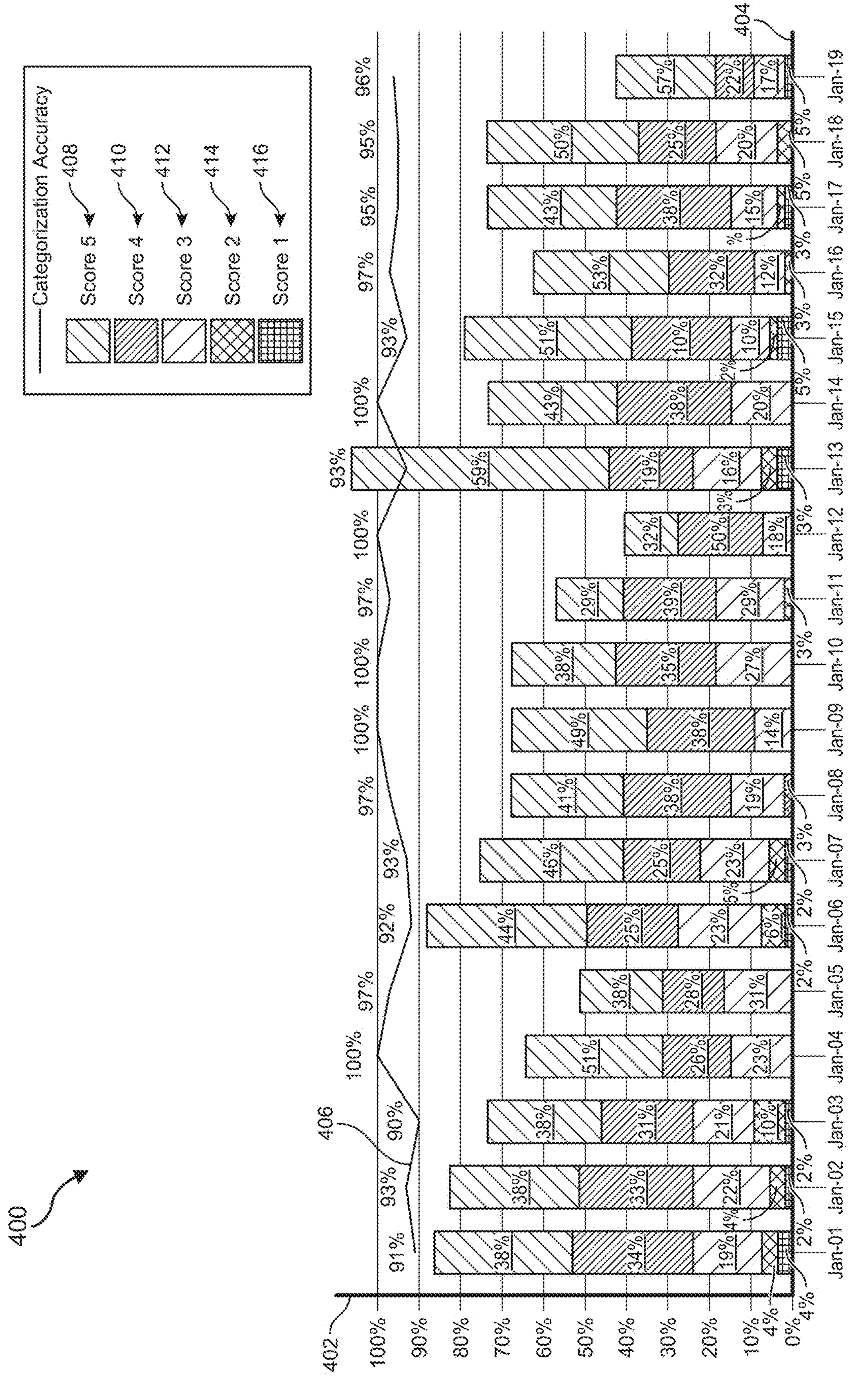
FIG. 4 illustrates an example of a performance chart that may be used to visualize the effectiveness and distribution of ticket categorization scores over time.

FIG. 4 illustrates an example of a performance chart 400 that may be utilized to visualize the effectiveness and distribution of ticket categorization scores over time. The performance chart 400 may include a vertical axis 402 and a horizontal axis 404, which together may define a two-dimensional space for representing various data points and trends related to ticket categorization. The vertical axis 402 may represent percentage values, while the horizontal axis 404 may depict a series of dates, potentially enabling for the tracking of performance metrics over a specific time period.

The performance chart 400 may feature a graph line 406 positioned near the top of the chart, which may be labeled as "categorization accuracy" in the accompanying legend. This categorization accuracy line 406 may provide a visual representation of how the overall accuracy of the ticket categorization system may change over time. In the example shown, the categorization accuracy line 406 may begin at approximately 91% on January 1 and may fluctuate between roughly 90% and 100% throughout the depicted time period, ultimately reaching about 96% on January 19. These fluctuations in the categorization accuracy line 406 may potentially reflect various factors influencing the system's performance, such as changes in ticket volume, updates to the categorization algorithms, or variations in the types of issues being reported.

In addition to the categorization accuracy line 406, the performance chart 400 may include a series of bar charts for each date along the horizontal axis 404. These bar charts may utilize different hatching patterns to represent the distribution of tickets across five distinct categorization scores. The legend of the performance chart 400 may indicate that these scores are represented by specific hatching patterns and may be labeled as score 5 408, score 4 410, score 3 412, score 2 414, and score 1 416. This multi-level scoring system may provide a nuanced view of how confident the categorization system is in its classifications, with higher scores potentially indicating greater confidence.

For each date represented on the horizontal axis 404, the corresponding bar chart may show the percentage of tickets assigned to each of the five score categories. For instance, on January 1, the chart may indicate that approximately 4% of tickets received a score of 1 (represented by the hatching pattern corresponding to score 1 416), another 4% received a score of 2 (represented by the hatching pattern for score 2 414), about 19% were assigned a score of 3 (depicted by the hatching for score 3 412), roughly 34% obtained a score of 4 (shown by the hatching for score 4 410), and approximately 38% achieved a score of 5 (illustrated by the hatching pattern for score 5 408). This detailed breakdown may offer insights into the distribution of categorization confidence across the ticket dataset for each day.

The use of stacked bar charts in the performance chart 400 may enable easy comparison of score distributions across different dates. By examining how the proportions of each score category change from day to day, users of the system may potentially identify trends or anomalies in categorization performance. For example, a sudden increase in the proportion of low-scoring tickets (scores 1 and 2) on a particular date might prompt investigation into potential issues with the categorization system or changes in the nature of incoming support tickets.

Moreover, the juxtaposition of the categorization accuracy line 406 with the daily score distributions may provide a comprehensive view of system performance. In some cases, users might observe that high overall accuracy (as indicated by the line 406) corresponds with a larger proportion of high-scoring tickets (scores 4 and 5). Conversely, dips in the accuracy line might coincide with an increased percentage of lower-scoring tickets. These correlations may offer valuable insights into the relationship between the system's confidence in its categorizations and its overall accuracy.

The performance chart 400 may serve as a powerful tool for monitoring and analyzing the effectiveness of the ticket categorization system over time. By visualizing both the overall accuracy trend and the daily distribution of confidence scores, the chart may enable support teams and system administrators to track performance, identify potential areas for improvement, and make data-driven decisions about system tuning or resource allocation. For instance, if the chart reveals a consistent pattern of low-scoring tickets in a particular time period, it might suggest the need for additional training data or refinement of the categorization algorithms for specific types of issues.

Furthermore, the granularity of data presented in the performance chart 400 may support various levels of analysis. At a high level, the categorization accuracy line 406 may provide a quick overview of system performance trends. At a more detailed level, the daily score distributions may offer insights into the nuances of the system's decision-making process. This multi-layered technique to data visualization may cater to different user needs, from executives seeking a broad performance overview to technical teams requiring in-depth performance metrics.

Figure 5:
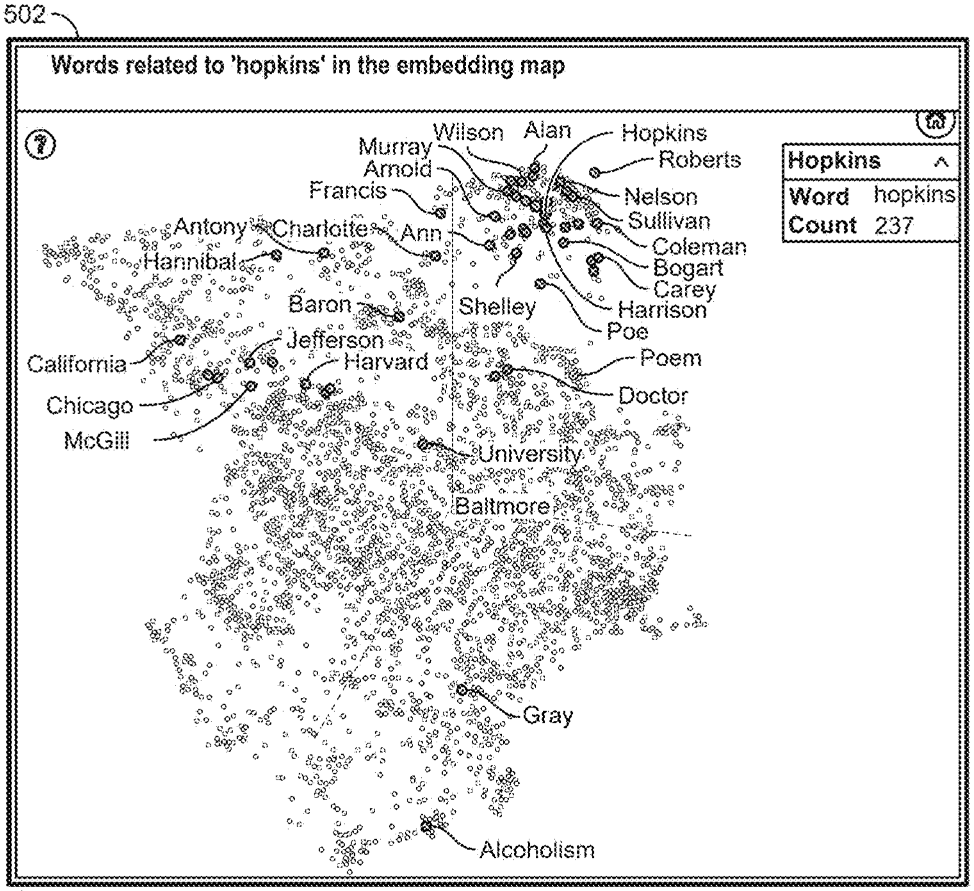
FIG. 5 depicts an example visualization for word embeddings concepts.
Figure 5:
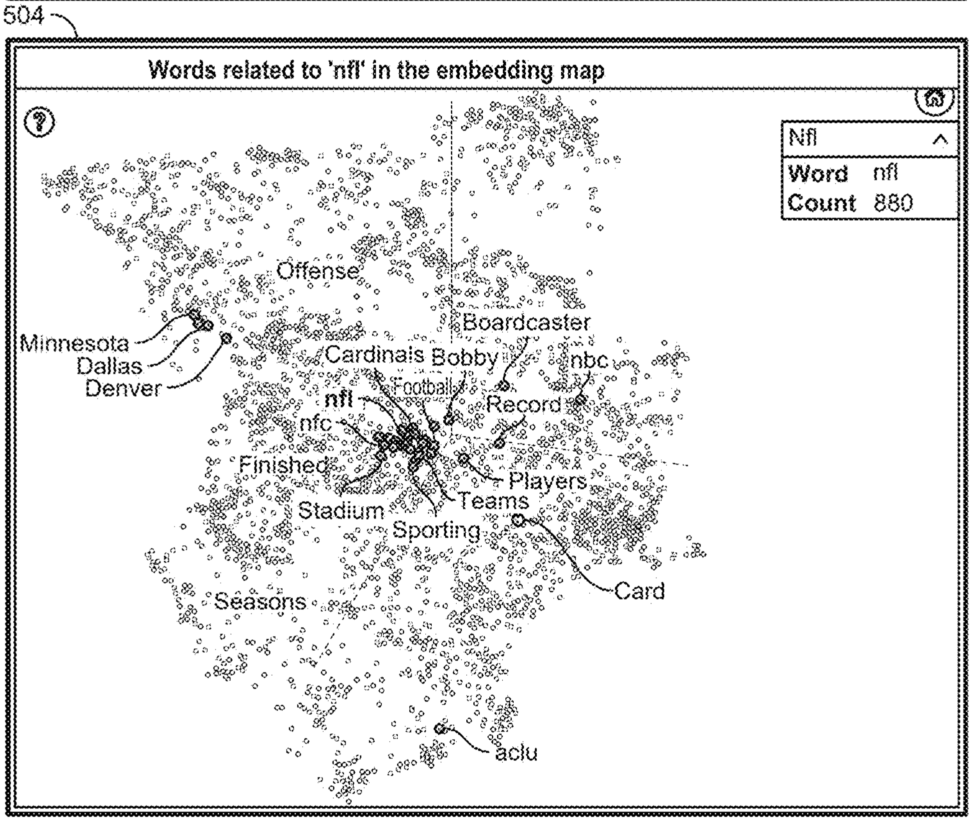

FIG. 5 illustrates an example of word embedding visualizations that may be used to analyze and understand the semantic relationships between terms in support ticket data. The figure may comprise two scatter plots, each representing a different focal term and its related words in a two-dimensional embedding space.

The upper diagram 502 may depict words related to "hopkins" in the embedding map. This visualization may provide insights into the contextual usage and associations of the term "hopkins" within the support ticket corpus. The scatter plot may show various terms positioned in relation to "hopkins" based on their semantic similarity. Terms such as "Gray," "Alcoholism," "Baltimore," "McGill," and "California" may be visible in the plot, suggesting potential connections to medical institutions, research topics, or geographical locations associated with "Hopkins." The legend of diagram 502 may indicate that the word "hopkins" appears 237 times in the analyzed dataset, providing a measure of its frequency and potential importance in the support ticket context.

In the "hopkins" embedding map, terms like "Baltimore" and "McGill" may appear closer to the central "hopkins" point, potentially indicating stronger semantic associations. This proximity may suggest that these terms are often used in similar contexts or are closely related to discussions involving "hopkins." For instance, "Baltimore" might be closely associated due to the location of Johns Hopkins University, while "McGill" may be related through academic or research connections. On the other hand, terms like "Alcoholism" or "California" might appear farther from the central point, possibly indicating more tangential or diverse contexts in which these terms are used in relation to "hopkins."

The lower diagram 504 may show words related to "nfl" in the embedding map, offering a visualization of terms associated with the National Football League (NFL) in the support ticket data. This scatter plot may include terms such as "Minnesota," "Dallas," "sporting," and "stadium," reflecting the sports-related context of "nfl." The legend for diagram 504 may indicate that the term "nfl" appears 880 times in the dataset, suggesting it may be a more frequently discussed topic compared to "hopkins" in the analyzed support tickets.

In the "nfl" embedding map, terms like "Dallas" and "Minnesota" may be positioned closer to the central "nfl" point, potentially indicating strong associations with specific teams or locations frequently mentioned in NFL-related discussions. The term "stadium" might also appear in close proximity, reflecting its relevance to NFL-related topics. Conversely, more general terms like "sporting" might be positioned farther from the central point, possibly suggesting a broader context that extends beyond specific NFL-related discussions.

Figure 6:
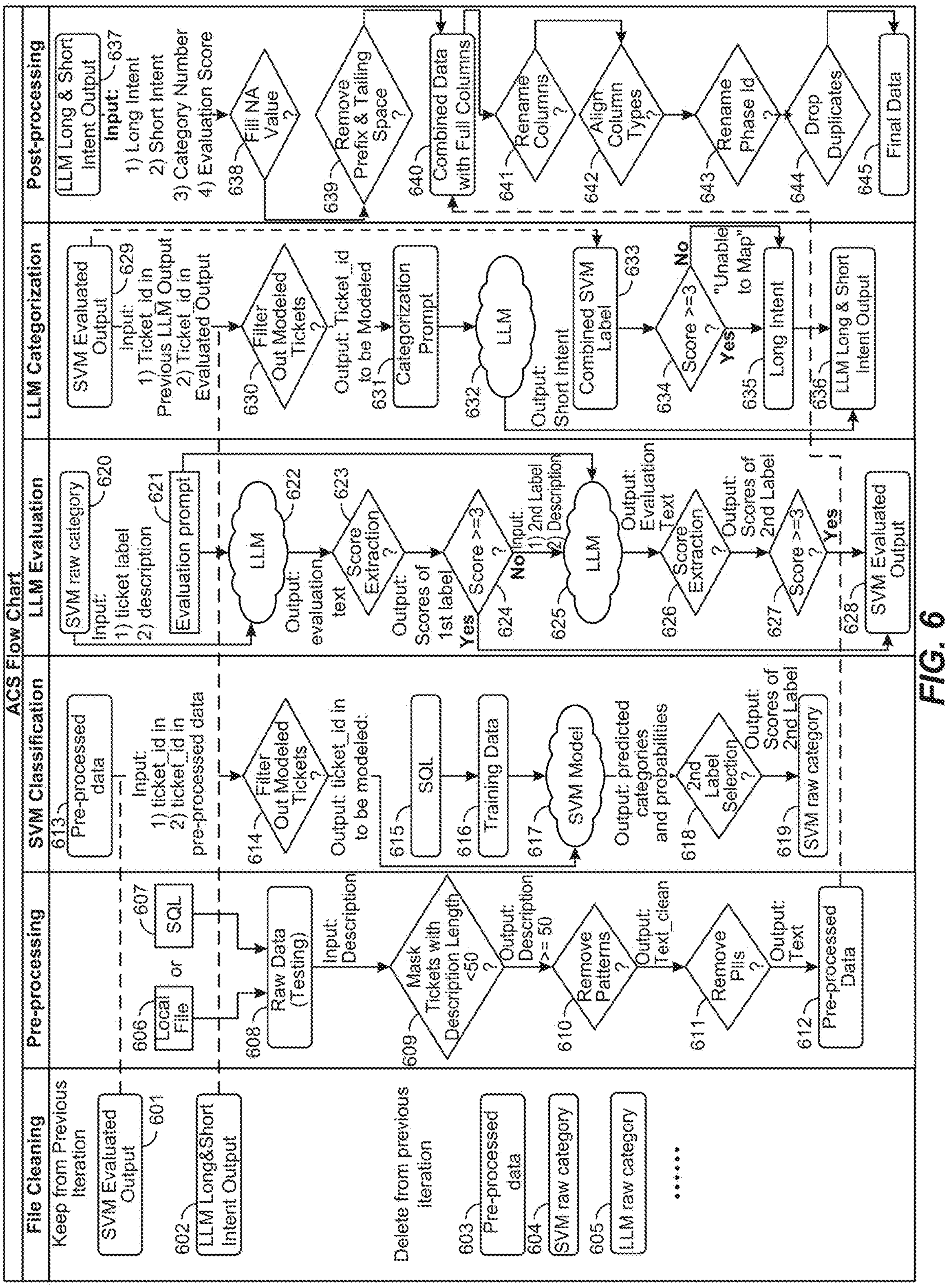
FIG. 6 shows an example of a comprehensive workflow diagram that may represent a sophisticated ticket processing and categorization system.

FIG. 6 illustrates an example of a comprehensive workflow diagram 600 that may represent a sophisticated ticket processing and categorization system. The workflow diagram 600 may be divided into six main columns, each representing a distinct phase of the ticket processing pipeline: file cleaning, pre-processing, support vector machine (SVM) classification, large language model (LLM) evaluation, LLM categorization, and post-processing. This multi-stage technique may potentially enable a thorough and nuanced analysis of support tickets, leveraging both traditional machine learning techniques and advanced language models to achieve accurate categorization and insightful processing of customer support issues.

In the file cleaning column, the workflow may begin with a step to retain certain data from previous iterations. This may include SVM evaluated output 601 and an LLM long and short intent output 602. These steps may potentially enable the system to leverage previously processed information, which may improve efficiency and maintain consistency across processing cycles. By retaining valuable insights from past analyses, the system may build upon its existing knowledge base, potentially leading to more accurate and contextually relevant categorizations over time. The SVM evaluated output 601 may connect to the SVM classification column, specifically to a pre-processed data step 613, potentially indicating that the system may use previously evaluated data to inform new classifications. This feedback loop may enable the system to learn from its past performance, potentially refining its classification algorithms based on successful outcomes from previous iterations.

Similarly, the LLM long and short intent output 602 may connect to the LLM categorization column, feeding into the process between an SVM evaluated output step 629 and a filter out modeled tickets step 630. This connection may suggest that the system may use previously generated intent data to enhance or guide the categorization process for new tickets. By incorporating these longer-form interpretations of ticket content, the system may potentially capture nuances and contextual information that might be missed by more rigid classification methods, leading to a more comprehensive understanding of customer issues.

The file cleaning column may also include steps to remove outdated or unnecessary data. This may be represented by a "delete from previous iteration" indicator, followed by steps to clear pre-processed data 603, SVM raw category data 604, and/or LLM raw category data 605. By selectively retaining useful information and discarding outdated data, the system may potentially maintain an efficient and relevant dataset for each processing cycle. This data hygiene process may be crucial for ensuring that the system operates on the most current and pertinent information, potentially reducing noise in the dataset and improving overall classification accuracy.

Moving to the pre-processing column, the workflow may illustrate two potential data sources: a local file 606 or an SQL Database 607. These data sources may feed into a raw data (testing) step 608, which may represent the initial ingestion of ticket data into the system. The flexibility to draw from multiple data sources may enable the system to accommodate various organizational structures and data management practices, potentially making it more adaptable to different support environments.

Following data ingestion, the pre-processing phase may involve several decision steps aimed at refining and standardizing the ticket data. A mask tickets with description length less than 50 decision step 609 may potentially filter out very short ticket descriptions that may not contain sufficient information for accurate categorization. This step may help ensure that the system only processes tickets with enough contextual information to make meaningful categorizations, potentially improving the overall quality of the analysis.

Tickets passing this filter may then proceed to a remove patterns decision step 610, which may eliminate certain standardized or unnecessary text patterns from the descriptions. This step may be valuable for reducing noise in the data, removing boilerplate text or repetitive elements that do not contribute to the understanding of the customer's issue. By streamlining the ticket descriptions, this step may potentially help the subsequent classification and evaluation processes focus on the most relevant content.

Subsequently, a remove personally identifiable information (PII)s decision step 611 may be employed to potentially remove or mask personally identifiable information, which may be important for maintaining customer privacy and compliance with data protection regulations. This step underscores the system's potential to handle sensitive information responsibly.

The output of these pre-processing steps may be a cleaned and standardized dataset, represented by a pre-processed data step 612. This refined dataset may serve as the foundation for the subsequent analysis phases, potentially improving the accuracy and reliability of the classification and evaluation processes.

In the SVM classification column, the workflow may begin with the pre-processed data step 613, which may receive input from both the file cleaning and pre-processing phases. This step may generate an input comprising ticket IDs and their corresponding pre-processed descriptions, creating a standardized format for the classification process. A filter out modeled tickets decision step 614 may potentially identify and exclude tickets that have already been processed, focusing the classification effort on new or updated tickets. This efficiency measure may help optimize system resources by avoiding redundant processing of unchanged tickets.

The support vector machine (SVM) classification process may be represented by an SVM model step 617, which may receive training data from an SQL Database step 615 via a training data step 616. This arrangement indicates that, in some examples, the system may continuously update its training data, potentially improving classification accuracy over time. The ongoing refinement of the training dataset may enable the SVM model to adapt to evolving customer issues and support trends, maintaining its relevance and effectiveness in a dynamic support environment.

The SVM model 617 may output predicted categories and probabilities, which may then be subject to a second label selection decision step 618. This step may potentially enable for the consideration of alternative classifications when the primary classification does not meet certain confidence thresholds. By considering multiple potential categories, the system may account for ambiguous or complex tickets that may not fit neatly into a single category, potentially providing a more nuanced understanding of the customer's issue.

The output of this process may be an SVM raw category step 619, representing the initial machine learning-based categorization of the tickets. These raw categories may serve as a starting point for further refinement and validation in subsequent stages of the workflow.

The LLM evaluation column may illustrate a process for validating and refining the SVM classifications using large language models (LLM). Beginning with an SVM raw category step 620, the workflow may show how the initial classifications may be evaluated using an LLM 622. This evaluation may be guided by an evaluation prompt step 621, which may potentially provide context or instructions to the language model. The use of a large language model (LLM) in this stage may introduce a more sophisticated, context-aware evaluation of the SVM classifications, potentially catching nuances or complexities that the SVM model might have missed.

The LLM 622 may generate evaluation text, which may then undergo a score extraction process represented by a score extraction decision step 623. This step may quantify the language model's assessment of the classification accuracy, translating the nuanced language output into actionable metrics. The resulting scores may be assessed in a score greater than or equal to three decision step 624. This threshold-based technique may help ensure that only high-confidence classifications proceed without further scrutiny.

If the score meets or exceeds the threshold, the ticket may proceed to an SVM evaluated output step 628. For scores below the threshold, the system may perform a secondary evaluation using another LLM 625, potentially with a different prompt or focus. This two-tiered evaluation process may provide an additional layer of validation for challenging or ambiguous tickets, potentially improving the overall accuracy of the categorization.

This secondary evaluation may also undergo score extraction step 626 and threshold assessment step 627, with high-scoring tickets ultimately reaching the SVM evaluated output step 628. By subjecting lower-confidence classifications to this additional scrutiny, the system may potentially reduce misclassifications and ensure that even complex tickets receive accurate categorization.

The LLM categorization column may represent a further refinement of the ticket categorization process. Starting with the SVM evaluated output step 629, the workflow may show a filter out modeled tickets decision step 630, which may potentially identify tickets requiring additional processing. This step may help optimize system resources by focusing the more computationally intensive language model processing on tickets that truly require it.

Filtered tickets may undergo categorization using another LLM 632, guided by a categorization prompt step 631. This process may generate both long and short intent outputs, represented by an LLM long & short intent output step 636. The generation of both long and short intents may provide a multi-faceted understanding of the ticket content, potentially capturing both the overall context and the specific core issue.

Concurrently, tickets not requiring additional modeling may follow a separate path, represented by a dashed line, to a combined SVM label step 633. These combined labels may be subject to a score assessment in a score greater than or equal to three decision step 634, with high-scoring tickets classified as long intent step 635 and low-scoring tickets marked as "unable to map" but still proceeding to the long intent step 635. This bifurcated technique may enable the system to handle both straightforward and complex tickets efficiently, dedicating more resources to challenging cases while streamlining the process for clearer, more easily categorized tickets. Both paths may ultimately converge at the LLM long & short intent output step 636.

The post-processing column may illustrate the final steps in refining and standardizing the categorized ticket data. Beginning with the LLM long and short intent output step 637, the workflow may show a series of data cleaning and formatting steps. These steps may be crucial for ensuring that the processed ticket data is consistent, complete, and ready for use by support teams or other downstream systems.

A fill not applicable (NA) value decision step 638 may address any missing data points, potentially using intelligent interpolation or default values to ensure completeness of the dataset. This step may be important for maintaining the integrity of the data and preventing errors in subsequent analysis or reporting due to incomplete information. The remove prefix and trailing space decision step 639 may focus on text standardization, potentially eliminating inconsistencies in formatting that may interfere with data analysis or visualization. By ensuring that all text fields adhere to a consistent format, this step may improve the reliability of text-based searches and comparisons across the ticket database. A combined data with full columns step 640 may serve to consolidate the processed information, potentially merging data from various stages of the workflow into a comprehensive ticket record. This consolidation may provide a holistic view of each ticket, including its original content, classification results, and/or any additional insights generated during the processing pipeline.

Further refinements may include steps to rename columns step 641, align column types step 642, rename phase ID step 643, and/or drop duplicates step 644. These steps may be essential for helpful that the final dataset is well-structured and optimized for use in reporting tools, dashboards, or other analytical systems. By standardizing column names and data types, the system may facilitate easier integration with various business intelligence tools and enable more consistent reporting across different teams or departments.

The culmination of this post-processing may be a final data step 645, representing the fully processed and categorized ticket data ready for analysis or action by support teams. This final dataset may serve as a valuable resource for understanding customer issues, identifying trends, and informing strategic decisions about product development or support resource allocation.

Figure 7:
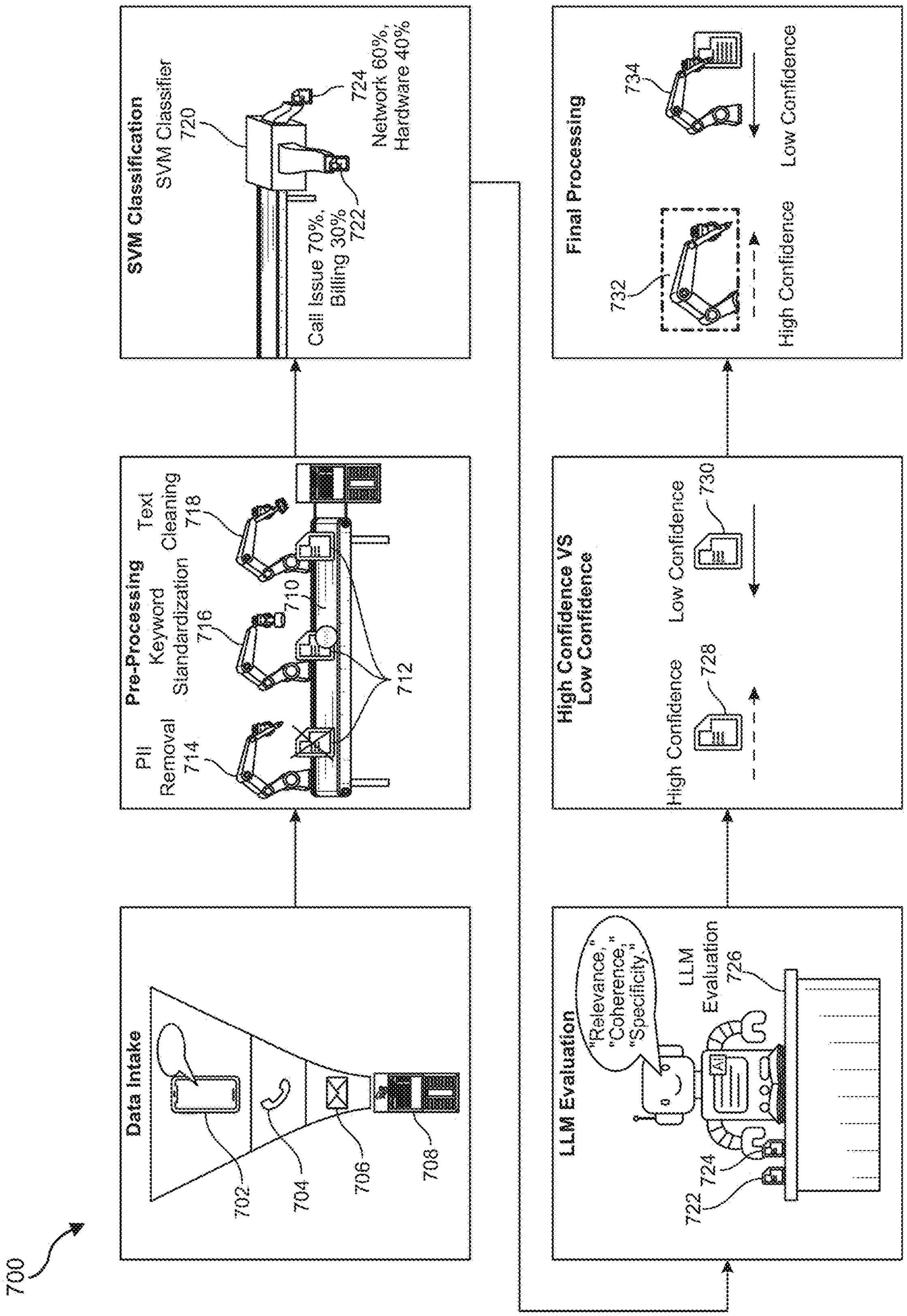
FIG. 7 illustrates an example multi-panel illustration of a ticket processing pipeline.

FIG. 7 illustrates an example of a multi-panel illustration 700 that may depict various stages of a ticket processing pipeline. This illustration 700 may provide a comprehensive overview of the journey a support ticket may undergo from initial intake to final resolution.

The first panel of the illustration 700 may focus on the data intake process, represented by a large funnel 700 labeled "Data Intake." This funnel 700 may symbolize the system's ability to collect and consolidate support tickets from various sources. At the top of the funnel 700, the illustration may show different types of incoming support tickets, including a smartphone with a chat bubble 702, representing mobile or chat-based support requests; a telephone 704, indicating voice-based support calls; and an envelope 706, symbolizing email-based support tickets. These diverse input methods may highlight the system's capability to handle multiple communication channels, potentially improving accessibility for customers with different preferences or needs. The funnel 700 may narrow down to a server 708 at its base, representing the centralized data storage system where all incoming ticket information may be consolidated and prepared for further processing.

In the second panel, the illustration 700 may depict a preprocessing stage, represented by a conveyor belt 710 emerging from the server 708. This conveyor belt 710 may symbolize the automated flow of tickets through various preprocessing steps. On the conveyor belt 710, several document icons 712 may be visible, each representing individual support tickets moving through the system. Above the conveyor belt 710, the illustration may show three robotic arms, each performing a specific preprocessing task. The first robotic arm 714, labeled "PII Removal," may be shown with a black marker, potentially crossing out parts of the documents. This robotic arm 714 may represent the system's ability to identify and redact personally identifiable information, ensuring customer privacy and compliance with data protection regulations. The second robotic arm 716, labeled "Keyword Standardization," may be depicted with a stamp, symbolizing the process of normalizing language and terminology across tickets. This standardization may be important for improving the accuracy of subsequent analysis and categorization steps. The third robotic arm 718, labeled "Text Cleaning," may be illustrated with a brush, sweeping over the documents. This robotic arm 718 may represent processes such as removing irrelevant characters, correcting spelling errors, or eliminating stop words, potentially enhancing the quality of the text data for analysis.

The third panel of the illustration 700 may focus on the support vector machine (SVM) classification process. This panel may feature a large machine 720 labeled "SVM Classifier," representing the core classification algorithm. The machine 720 may be shown with two output chutes, emphasizing the system's ability to generate multiple classification labels for each ticket. From each chute, a document icon 722 and 724 is depicted sliding out, each with two labels attached. These labels may display example classifications and their associated probabilities, such as "Call Issue 70%, Billing 30%" and "Network 60%, Hardware 40%". This visual representation may illustrate the nuanced, probabilistic nature of the classification process, highlighting how the system may consider multiple potential categories for each ticket.

In the fourth panel, the illustration 700 may depict the large language model (LLM) evaluation stage. This panel may feature a judge's bench 726 labeled "LLM Evaluation," symbolizing the role of the language model in assessing and validating the initial classifications. Behind the judge's bench 726, instead of a human judge, the illustration shows a robotic figure with a glowing "AI" symbol on its chest, representing the artificial intelligence (AI) driving this evaluation process. In front of the judge's bench 726, the previously classified document icons 722 and 724 from the SVM classification stage may be visible, indicating that these initial classifications are now subject to LLM evaluation. Above the robotic judge, a thought bubble is shown containing a scale, balancing various factors such as "Relevance," "Coherence," and "Specificity." This thought bubble may represent the complex, multi-faceted analysis performed by the LLM in evaluating the appropriateness and accuracy of the SVM classifications.

The fifth panel of the illustration 700 may visualize the diverging paths for high-confidence and low-confidence classifications. This panel may show two arrows emerging from the LLM evaluation stage: a green arrow 728 labeled "High Confidence" leading to a neat stack of document icons, and a red arrow 730 labeled "Low Confidence" leading to a separate area. This bifurcation may represent how the system may handle tickets differently based on the confidence level of their classifications. The high-confidence path may indicate tickets that have received strong, consistent classifications through both the SVM and LLM stages, while the low-confidence path may represent tickets that may require additional processing or human intervention.

In the final panel, the illustration 700 may depict the final stage of ticket processing. For the high-confidence path, a robot arm 732 may be shown attaching final labels to the documents, representing the automated assignment of definitive categories to these tickets. On the low-confidence path, a more detailed robot 734 may be illustrated writing longer descriptions on the documents. This contrast may highlight how the system may adapt its output based on the confidence level of the classifications, potentially providing more detailed, nuanced descriptions for tickets that do not fit neatly into predefined categories.

Figure 8:
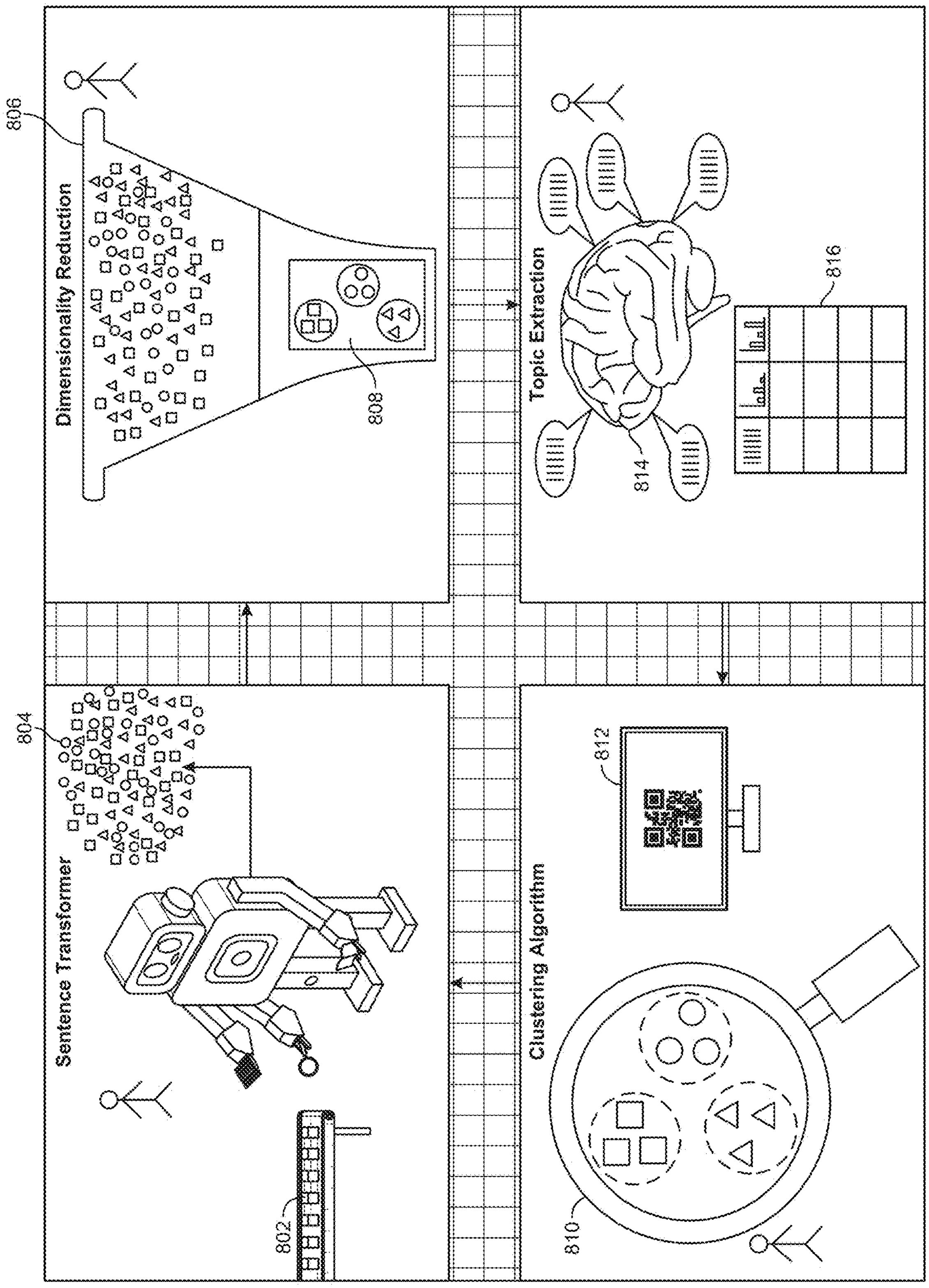
FIG. 8 shows an example visualization of clustering and topic extraction processes in ticket analysis.

FIG. 8 illustrates an example clustering and topic extraction visualization that represents various stages of advanced ticket analysis. This figure is divided into four quadrants, each depicting a different phase of the process: Sentence Transformer, Dimensionality Reduction, Clustering Algorithm, and Topic Extraction.

In the top left quadrant of FIG. 8, a large, rectangular robot-like machine 800 occupies the central space, representing the Sentence Transformer phase. One arm of the robot machine 800 holds a magnifying glass, another an abacus, and a third an open book. These diverse tools may symbolize the various analytical capabilities of the sentence transformer, such as detailed examination, numerical processing, and knowledge application. To the left of the robot machine 800, a conveyor belt enters the quadrant, carrying 5-7 small rectangles 802. These rectangles 802 may represent individual support tickets entering the analysis pipeline. On the right side of the robot machine 800, an arrow points to a cluster of small shapes 804, composed of 20-30 circles, triangles, and squares scattered randomly. This transformation from rectangles to diverse shapes may illustrate how the sentence transformer converts text data into a more abstract, numerical representation suitable for further analysis.

The top right quadrant focuses on the Dimensionality Reduction phase, featuring a large funnel shape 806 that dominates this section. The wide end of the funnel 806 is positioned at the top, narrowing towards the bottom. At the top of the funnel 806, the same mix of shapes from the previous quadrant (circles, triangles, squares) may be seen entering the funnel. This input may represent the high-dimensional data output from the sentence transformer. At the narrow end of the funnel 806, a flat surface 808 is depicted. On this surface 808, the same shapes are arranged in 3-4 distinct clusters, with each cluster predominantly containing shapes of one type. This arrangement may illustrate how dimensionality reduction techniques may reveal underlying patterns and similarities in the data, grouping similar tickets together in a lower-dimensional space.

The bottom left quadrant illustrates the Clustering Algorithm phase. A large magnifying glass 810 occupies the center of this quadrant. Inside the magnifying glass 810, the clustered shapes from the previous quadrant are recreated, but larger and with dashed lines circling each cluster. This visualization may emphasize how the clustering algorithm identifies and delineates groups of similar tickets. Adjacent to the magnifying glass 810, a rectangle representing a computer screen 812 is drawn. Inside this rectangle 812, several lines of zigzag patterns are depicted to represent text or code. This element may suggest the computational processes underlying the clustering algorithm, highlighting the technical sophistication of this stage.

The bottom right quadrant depicts the Topic Extraction phase. A large, brain-shaped outline 814 occupies the top half of this quadrant, symbolizing the cognitive aspects of topic modeling. From this brain shape 814, 5-6 thought bubble shapes extend outwards. Inside each thought bubble, short, straight lines are drawn to represent text. These thought bubbles may illustrate how the system extracts distinct topics or themes from the clustered ticket data. Below the brain 814, a rectangular table 816 is drawn with 3 columns and 4-5 rows. In the first column of each row, short lines representing text are drawn. In the second and third columns, bar graphs of varying heights are depicted. This table 816 may represent a quantitative summary of the extracted topics, potentially showing topic labels, relevance scores, or frequency metrics.

Figure 9:
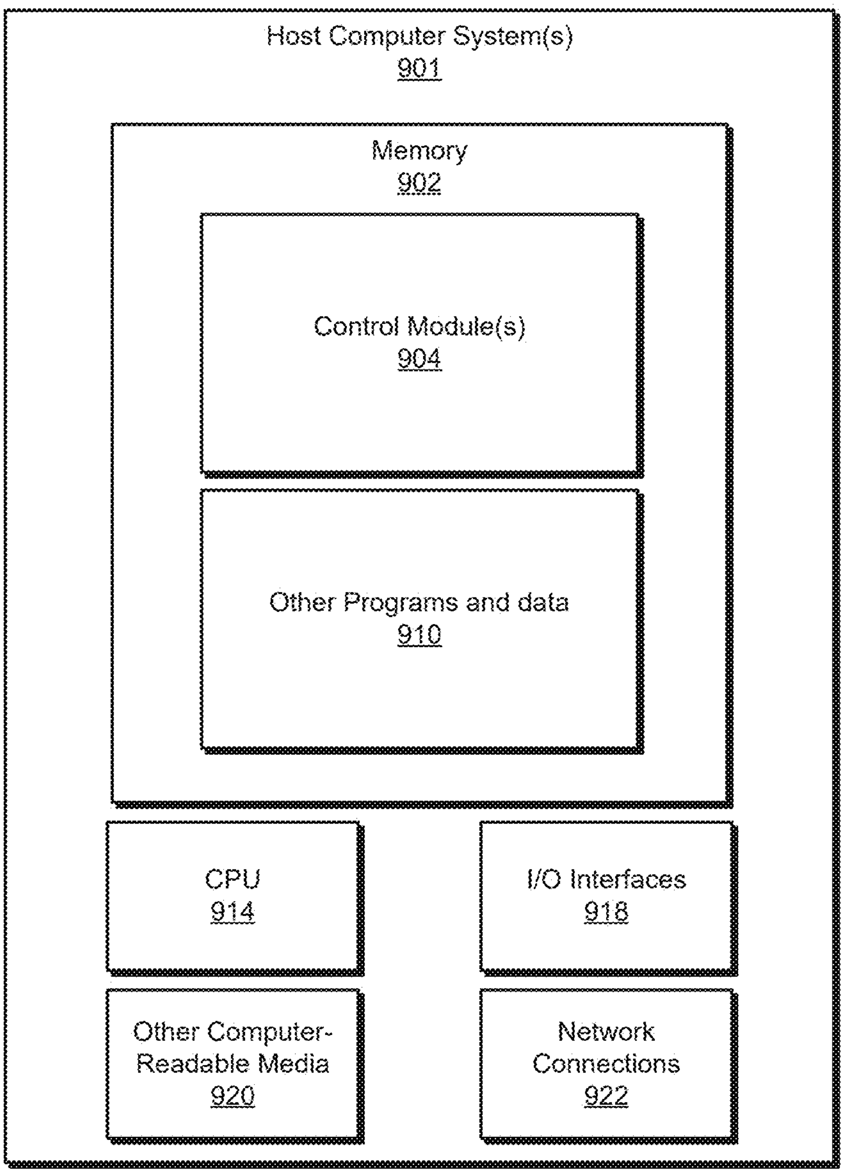
FIG. 9 shows a diagram of an example computing system that may facilitate the performance of one or more of the methods described herein.

FIG. 9 shows a system diagram that describes an example implementation of a computing system(s) for implementing embodiments described herein. The functionality described herein may be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, enabling higher deployment agility and flexibility. However, FIG. 9 illustrates an example of underlying hardware on which such software and functionality may be hosted and/or implemented.

In particular, shown is example host computer system(s) 901. For example, such computer system(s) 901 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems or components described herein. Memory 902 may also store other programs and data 910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

labeling, within a support ticket analysis system, an original set of support tickets for support calls received at a mobile operator by applying a non-generative machine learning classifier to each support ticket in the original set of support tickets to generate a set of support ticket labels, wherein labeling the original set of support tickets comprises applying a sentence transformer to generate text embeddings for each support ticket prior to classification by the non-generative machine learning classifier;

testing multiple prompts and selecting, based on performance metrics, an optimized prompt from the tested prompts;

evaluating the set of support ticket labels by prompting a large language model with the optimized prompt and the support ticket labels generated by the non-generative machine learning classifier to generate an evaluation score for each support ticket label;

categorizing the support tickets based on the evaluation scores into a first set of support tickets with evaluation scores at or above a threshold and a second set of support tickets with evaluation scores below the threshold;

prompting the large language model or another large language model to select a label from a predefined set of support categories maintained by a customer support system of the mobile operator for each support ticket in the first set and to apply an uncategorized label for each support ticket in the second set;

resolving a specific support ticket from the first set based at least in part on the label selected by the large language model or the other large language model for the specific support ticket;

identifying a new support ticket label in the second set by verifying that support tickets in a subset of the second set have respective descriptive summaries that satisfy a similarity threshold; and automatically triggering a predefined action for the specific support ticket based at least in part on the label selected by the large language model or the other large language model for the specific support ticket;

wherein:

the non-generative machine learning classifier comprises a support vector machine; and the support ticket analysis system learns in a feedback loop such that a classification algorithm is refined based on a successful outcome from a previous iteration of the feedback loop.

2. The method of claim 1, further comprising prompting the large language model or the other large language model to generate the respective descriptive summaries.

3. The method of claim 1, further comprising pre-processing the support tickets by removing personally identifiable information or standardizing domain-specific keywords prior to applying the non-generative machine learning classifier.

4. The method of claim 1, wherein the non-generative machine learning classifier generates two labels with associated probabilities for each support ticket in the original set of support tickets.

5. The method of claim 1, further comprising displaying an indicator of the specific support ticket in association with the label selected by the large language model or the other large language model for the specific support ticket within a graphical user interface for ticket management and analysis in a customer support environment.

6. The method of claim 5, wherein the graphical user interface enables sorting of support tickets by a first category or a second category that corresponds to the label.

7. The method of claim 1, further comprising clustering the support tickets in the first set by applying a text embedding model and an agglomerative clustering algorithm.

8. The method of claim 1, further comprising displaying the resolved support ticket in a user interface.

9. The method of claim 1, further comprising performing a file cleaning operation prior to labeling the original set of support tickets.

10. The method of claim 1, wherein the original set of support tickets is retrieved from a data estate by executing a database query.

11. The method of claim 1, further comprising removing outlier support tickets from the first set based on the outlier support tickets failing to satisfy a minimum cluster size threshold.

12. The method of claim 1, further comprising improving accuracy of the non-generative machine learning classifier based on feedback received from prompting the large language model or the other large language model.

13. The method of claim 1, wherein the support ticket analysis system comprises a ticket processing pipeline comprising:

a file cleaning stage;

a pre-processing stage;

a support vector machine stage;

a large language model evaluation stage;

a large language model categorization stage; and a post-processing stage.

14. The method of claim 13, wherein the support ticket analysis system learns in the feedback loop such that the classification algorithm is refined based on the successful outcome from the previous iteration of the feedback loop at least in part through support vector machine evaluated output that was evaluated by the support vector machine during the previous iteration being used at a pre-processed data step of the support vector machine stage.

15. The method of claim 14, wherein:

the pre-processed data step of the support vector machine stage receives the support vector machine evaluated output from the file cleaning stage.

16. The method of claim 1, wherein labeling the original set of support tickets comprises:

inputting the text embeddings of each support ticket to the non-generative machine learning classifier.

17. A non-transitory computer-readable medium that has instructions stored thereon that, when executed by at least one physical computing processor, cause a computing device to perform operations comprising:

labeling, within a support ticket analysis system, an original set of support tickets for support calls received at a mobile operator by applying a non-generative machine learning classifier to each support ticket in the original set of support tickets to generate a set of support ticket labels, wherein labeling the original set of support tickets comprises applying a sentence transformer to generate text embeddings for each support ticket prior to classification by the non-generative machine learning classifier;

testing multiple prompts and selecting, based on performance metrics, an optimized prompt from the tested prompts;

evaluating the set of support ticket labels by prompting a large language model with the optimized prompt and the support ticket labels generated by the non-generative machine learning classifier to generate an evaluation score for each support ticket label;

categorizing the support tickets based on the evaluation scores into a first set of support tickets with evaluation scores at or above a threshold and a second set of support tickets with evaluation scores below the threshold;

prompting the large language model or another large language model to select a label from a predefined set of support categories maintained by a customer support system of the mobile operator for each support ticket in the first set and to apply an uncategorized label for each support ticket in the second set;

resolving a specific support ticket from the first set based at least in part on the label selected by the large language model or the other large language model for the specific support ticket;

identifying a new support ticket label in the second set by verifying that support tickets in a subset of the second set have respective descriptive summaries that satisfy a similarity threshold; and automatically triggering a predefined action for the specific support ticket based at least in part on the label selected by the large language model or the other large language model for the specific support ticket;

wherein:

the non-generative machine learning classifier comprises a support vector machine; and the support ticket analysis system learns in a feedback loop such that a classification algorithm is refined based on a successful outcome from a previous iteration of the feedback loop.

18. The non-transitory computer-readable medium of claim 17, wherein the support ticket analysis system comprises a ticket processing pipeline comprising:

a file cleaning stage;

a pre-processing stage;

a support vector machine stage;

a large language model evaluation stage;

a large language model categorization stage; and a post-processing stage.

19. A support ticket analysis system comprising:

at least one physical computing processor of a computing device; and a non-transitory computer-readable medium that has instructions stored thereon that, when executed by the at least one physical computing processor, cause the computing device to perform operations comprising:

labeling, within the support ticket analysis system, an original set of support tickets for support calls received at a mobile operator by applying a non-generative machine learning classifier to each support ticket in the original set of support tickets to generate a set of support ticket labels, wherein labeling the original set of support tickets comprises applying a sentence transformer to generate text embeddings for each support ticket prior to classification by the non-generative machine learning classifier;

testing multiple prompts and selecting, based on performance metrics, an optimized prompt from the tested prompts;

evaluating the set of support ticket labels by prompting a large language model with the optimized prompt and the support ticket labels generated by the non-generative machine learning classifier to generate an evaluation score for each support ticket label;

categorizing the support tickets based on the evaluation scores into a first set of support tickets with evaluation scores at or above a threshold and a second set of support tickets with evaluation scores below the threshold;

prompting the large language model or another large language model to select a label from a predefined set of support categories maintained by a customer support system of the mobile operator for each support ticket in the first set and to apply an uncategorized label for each support ticket in the second set;

resolving a specific support ticket from the first set based at least in part on the label selected by the large language model or the other large language model for the specific support ticket;

identifying a new support ticket label in the second set by verifying that support tickets in a subset of the second set have respective descriptive summaries that satisfy a similarity threshold; and automatically triggering a predefined action for the specific support ticket based at least in part on the label selected by the large language model or the other large language model for the specific support ticket;

wherein:

the non-generative machine learning classifier comprises a support vector machine; and the support ticket analysis system learns in a feedback loop such that a classification algorithm is refined based on a successful outcome from a previous iteration of the feedback loop.

20. The system of claim 19, wherein the support ticket analysis system comprises a ticket processing pipeline comprising:

a file cleaning stage;

a pre-processing stage;

a support vector machine stage;

a large language model evaluation stage;

a large language model categorization stage; and a post-processing stage.

* * * * *